US012651703B2

(12) United States Patent
Nelson et al.

(10) Patent No.: US 12,651,703 B2
(45) Date of Patent: Jun. 9, 2026

(54) ULTRABROADBAND CASCADE CAPACITOR

(71) Applicant: KYOCERA AVX Components Corporation, Fountain Inn, SC (US)

(72) Inventors: Cory Nelson, Simpsonville, SC (US); Jeffrey Horn, Simpsonville, SC (US); Marianne Berolini, Greer, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 85 days.

(21) Appl. No.: 18/408,647

(22) Filed: Jan. 10, 2024

(65) Prior Publication Data

US 2024/0249880 A1    Jul. 25, 2024

Related U.S. Application Data

(60) Provisional application No. 63/481,199, filed on Jan. 24, 2023.

(51) Int. Cl.
*H01G 4/012* (2006.01)
*H01G 4/30* (2006.01)

(52) U.S. Cl.
CPC .............. *H01G 4/012* (2013.01); *H01G 4/30* (2013.01)

(58) Field of Classification Search
CPC .................................. H01G 4/30; H01G 4/012
See application file for complete search history.

(56) References Cited

U.S. PATENT DOCUMENTS

| | | | |
|---|---|---|---|
| 4,513,350 A | * | 4/1985 | Coleman ................ H01G 4/255 |
| | | | 29/25.42 |
| 10,937,575 B2 | | 3/2021 | Kirk et al. |
| 10,943,735 B2 | | 3/2021 | Horn et al. |
| 11,004,603 B2 | | 5/2021 | Horn et al. |
| 11,031,183 B2 | | 6/2021 | Horn et al. |
| 11,195,656 B2 | | 12/2021 | Berolini et al. |
| 11,211,201 B2 | | 12/2021 | Berolini et al. |
| 11,270,842 B2 | | 3/2022 | Berolini et al. |
| 11,361,907 B2 | | 6/2022 | Berolini et al. |

(Continued)

FOREIGN PATENT DOCUMENTS

| | | | | | |
|---|---|---|---|---|---|
| CN | 114005675 A | * | 2/2022 | ............. | H01G 4/012 |
| JP | H08273977 A | * | 10/1996 | | |

*Primary Examiner* — David M Sinclair
(74) *Attorney, Agent, or Firm* — Dority & Manning, P.A

(57) ABSTRACT

Multilayer capacitors are provided. For example, a multi-layer capacitor may include first and second terminals adjacent first and second opposing end surfaces, respectively, and a plurality of active electrode layers, each active electrode layer including a first active electrode electrically connected with the first terminal and a second active electrode electrically connected with the second terminal. The first active electrode may be spaced apart from the second active electrode in a lengthwise direction to form an active electrode end gap. The multilayer capacitor also may include a plurality of floating electrode layers, including topmost and bottommost floating electrode layers. The plurality of active electrode layers may be an odd number such that a topmost active electrode layer is disposed between the topmost floating electrode layer and a top surface and a bottommost active electrode layer is disposed between the bottommost floating electrode layer and a bottom surface.

19 Claims, 22 Drawing Sheets

(56)     References Cited

U.S. PATENT DOCUMENTS

| | | | |
|---|---|---|---|
| 11,495,406 | B2 | 11/2022 | Berolini et al. |
| 11,664,169 | B2 | 5/2023 | Berolini et al. |
| 11,676,763 | B2 | 6/2023 | Horn et al. |
| 11,721,488 | B2 | 8/2023 | Horn et al. |
| 11,728,092 | B2 | 8/2023 | Berolini et al. |
| 11,735,340 | B2 | 8/2023 | Kirk et al. |
| 11,830,676 | B2 | 11/2023 | Berolini et al. |
| 2010/0039749 | A1 * | 2/2010 | Ritter ..................... H01G 4/005 |
| | | | 29/25.42 |
| 2014/0293500 | A1 * | 10/2014 | Seo .......................... H01G 4/12 |
| | | | 29/25.42 |
| 2016/0133384 | A1 * | 5/2016 | Park ...................... H01G 4/232 |
| | | | 361/301.4 |
| 2019/0279820 | A1 * | 9/2019 | Horn ................... H01G 4/1227 |
| 2019/0304636 | A1 * | 10/2019 | Kirk .................... H01C 7/1006 |
| 2022/0115182 | A1 | 4/2022 | Berolini et al. |
| 2022/0189691 | A1 | 6/2022 | Berolini et al. |
| 2022/0216011 | A1 | 7/2022 | Berolini et al. |
| 2023/0068137 | A1 | 3/2023 | Berolini et al. |
| 2023/0368977 | A1 | 11/2023 | Berolini et al. |
| 2024/0371571 | A1 * | 11/2024 | Fukushima .......... H01G 4/1227 |

* cited by examiner

ULTRABROADBAND CASCADE CAPACITOR

RELATED APPLICATION

The present application is based upon and claims priority to U.S. Provisional Patent Application Serial No. 63/481,199, having a filing date of Jan. 24, 2023, which is incorporated herein by reference.

BACKGROUND

The diversity of modern technical applications creates a need for efficient electronic components and integrated circuits for use therein. Capacitors are a fundamental component used for filtering, coupling, bypassing and other aspects of such modern applications which may include wireless communications, alarm systems, radar systems, circuit switching, matching networks, and many other applications. Multilayer capacitors, such as multilayer ceramic capacitors, are typically constructed with a plurality of stacked dielectric-electrode layers. During manufacture, the layers may often be pressed and formed into a vertically stacked structure. Multilayer ceramic devices can include a single electrode or multiple electrodes in an array.

A dramatic increase in the speed and packing density of integrated circuits requires advancements in coupling capacitor technology in particular. When high capacitance coupling capacitors are subjected to the high frequencies of many present applications, performance characteristics become increasingly more important. Because capacitors are fundamental to such a wide variety of applications, their precision and efficiency are imperative. Many specific aspects of capacitor design have thus been a focus for improving their performance characteristics, such as improved power handling capabilities and/or improved loss characteristics.

SUMMARY

In accordance with one embodiment of the present disclosure, a multilayer capacitor may have a rectangular configuration defining first and second opposing end surfaces offset in a lengthwise direction, first and second opposing side surfaces offset in a widthwise direction, and top and bottom surfaces offset in a height-wise direction. The multilayer capacitor may include a first terminal adjacent the first opposing end surface and a second terminal adjacent the second opposing end surface. The multilayer capacitor further may include a plurality of active electrode layers, each active electrode layer of the plurality of active electrode layers including a first active electrode electrically connected with the first terminal and a second active electrode electrically connected with the second terminal. The first active electrode may be spaced apart from the second active electrode in the lengthwise direction to form an active electrode end gap. The multilayer capacitor also may include a plurality of floating electrode layers, each floating electrode layer of the plurality of floating electrode layers including a floating electrode. The plurality of floating electrode layers may include a topmost floating electrode layer that is closest of the plurality of floating electrode layers to the top surface and a bottommost floating electrode layer that is closest of the plurality of floating electrode layers to the bottom surface. The plurality of active electrode layers may be an odd number such that a topmost active electrode layer is disposed between the topmost floating electrode layer and the top surface and a bottommost active electrode layer is disposed between the bottommost floating electrode layer and the bottom surface.

In accordance with another embodiment of the present disclosure, a multilayer capacitor may include a capacitor body having a first opposing end surface opposite a second opposing end surface along a lengthwise direction. A first terminal may be adjacent the first opposing end surface, and a second terminal may be adjacent the second opposing end surface. The multilayer capacitor also may include a plurality of active electrode layers, each active electrode layer of the plurality of active electrode layers including a first active electrode electrically connected with the first terminal and a second active electrode electrically connected with the second terminal. The first active electrode may be spaced apart from the second active electrode in the lengthwise direction to form an active electrode end gap. The multilayer capacitor further may include a plurality of floating electrode layers, each floating electrode layer of the plurality of floating electrode layers including a floating electrode. A number of active electrode layers may be one greater than a number of floating electrode layers. The plurality of active electrode layers may be interleaved with the plurality of floating electrode layers in a stack along a height-wise direction, the stack having a top layer and a bottom layer. A respective one active electrode layer of the plurality of active electrode layers forms the top layer in the stack and a respective one active electrode layer of the plurality of active electrode layers forms the bottom layer in the stack.

BRIEF DESCRIPTION OF THE DRAWINGS

A full and enabling disclosure of the present subject matter, including the best mode thereof, directed to one of ordinary skill in the art, is set forth in the specification, which makes reference to the appended Figures, in which.

US 12,651,703 B2

Figure 2A:
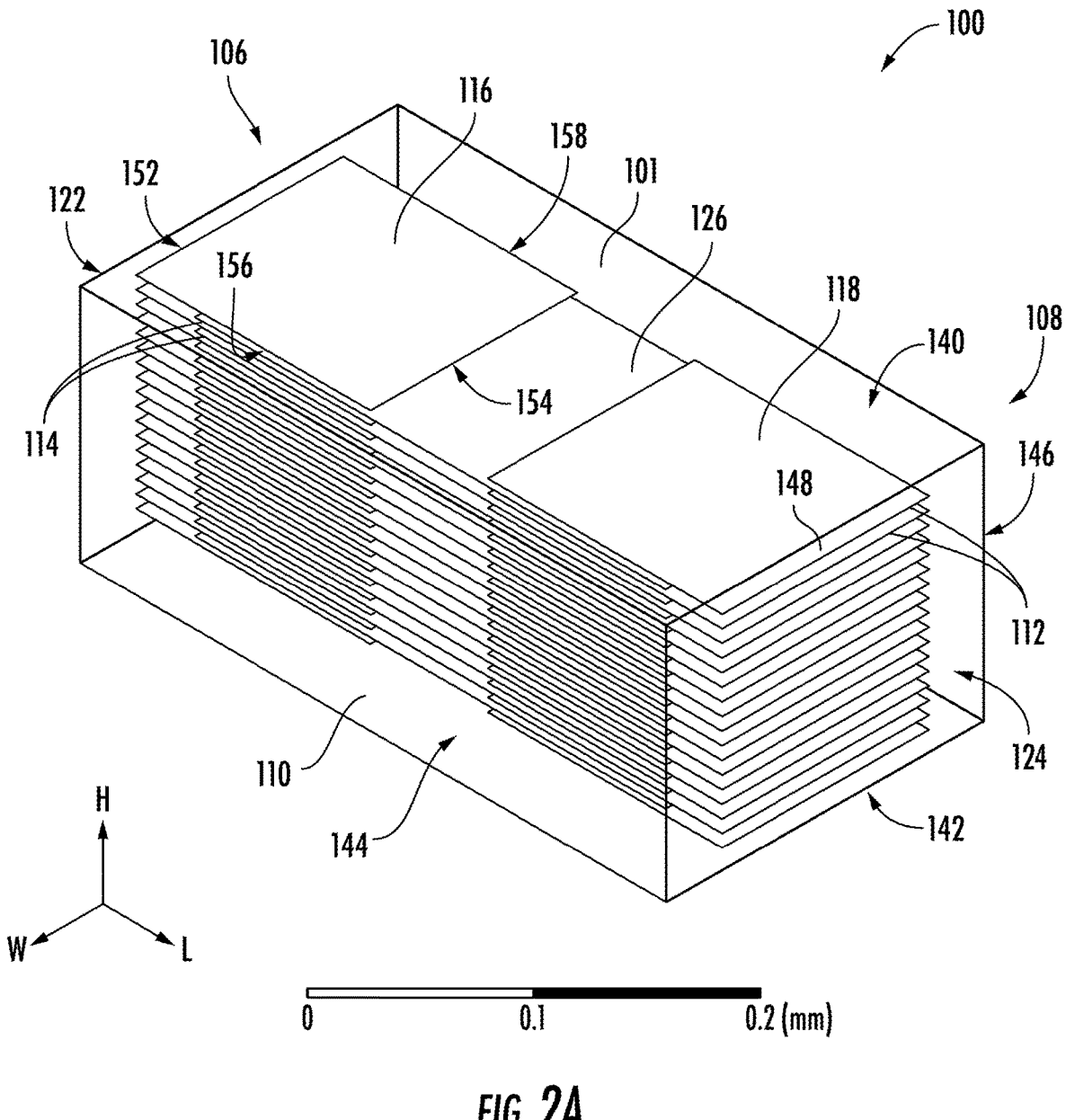
FIG. 2A illustrates a perspective view of a stack of layers forming a multilayer capacitor having a cascade configuration with a cover layer in accordance with aspects of this disclosure.
Figure 2B:
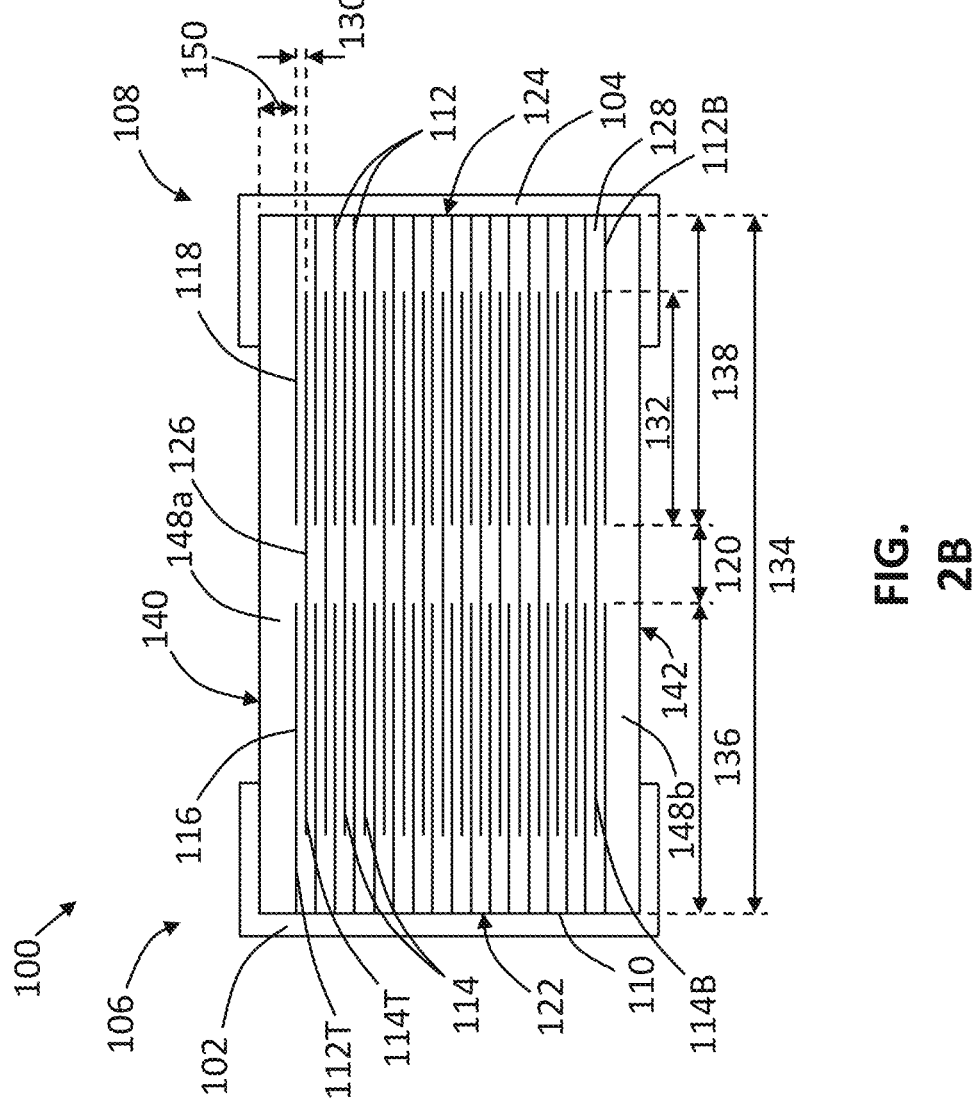
FIG. 2B illustrates a schematic cross-sectional view of the multilayer capacitor of FIG. 2A.
Figure 2B:
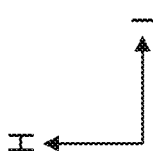
Figure 2C:
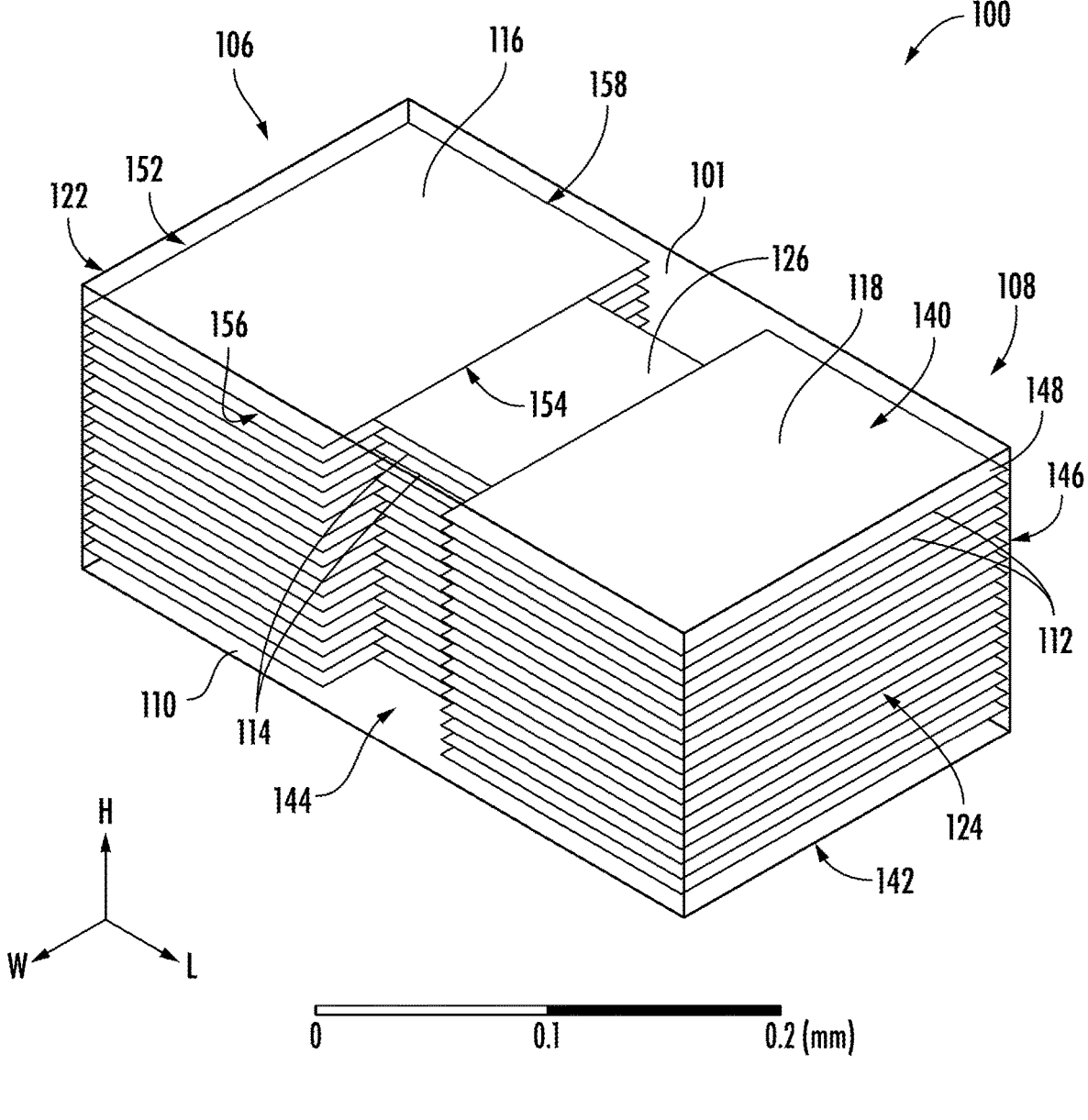
FIG. 2C illustrates a perspective view of a stack of layers forming a multilayer capacitor having a cascade configuration with connection layers extended to an edge of the capacitor in accordance with aspects of this disclosure.
Figure 3A:
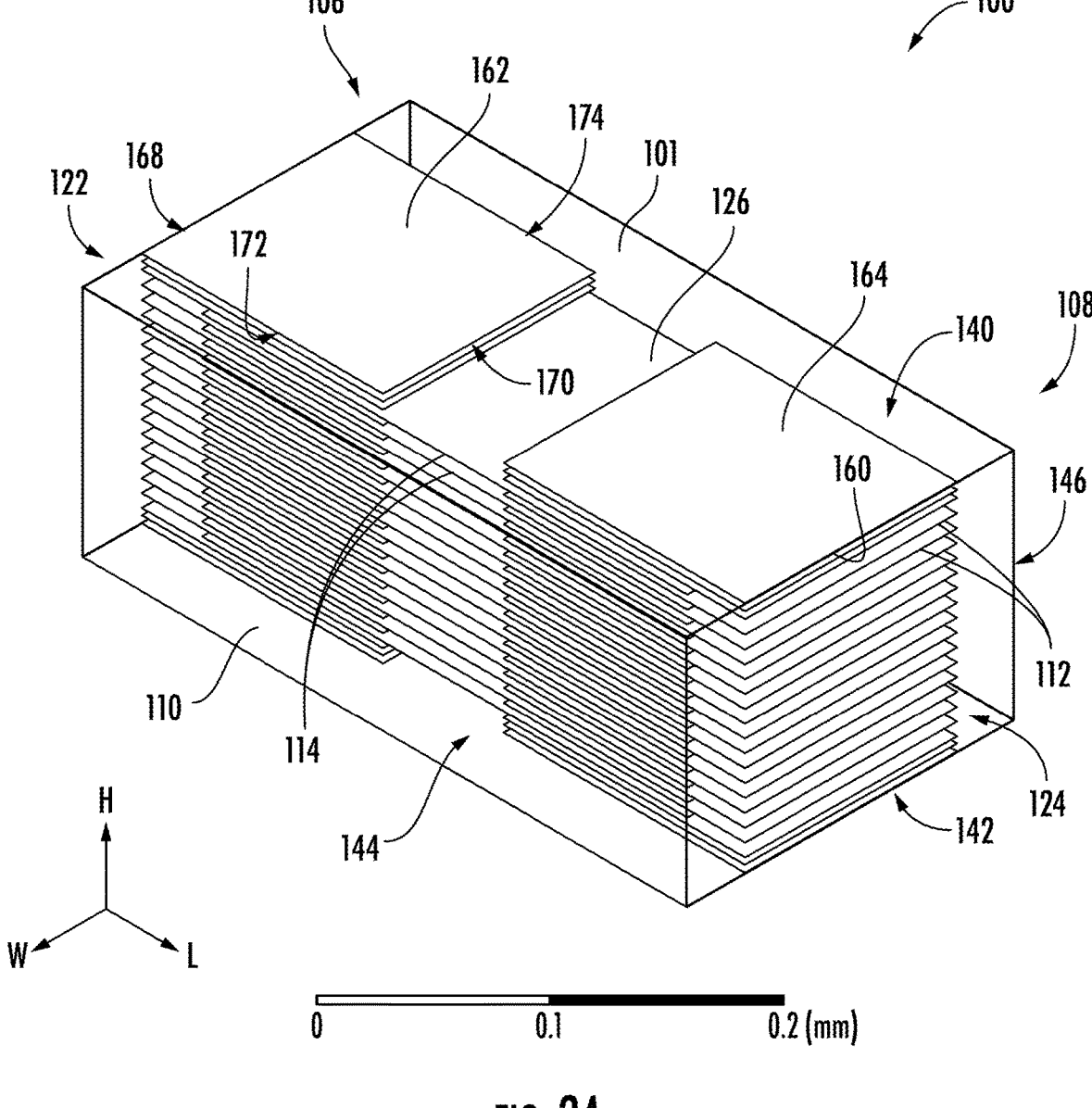
FIG. 3A illustrates a perspective view of a stack of layers forming a multilayer capacitor having a cascade configuration with at least one dummy layer in accordance with aspects of this disclosure.
Figure 3B:
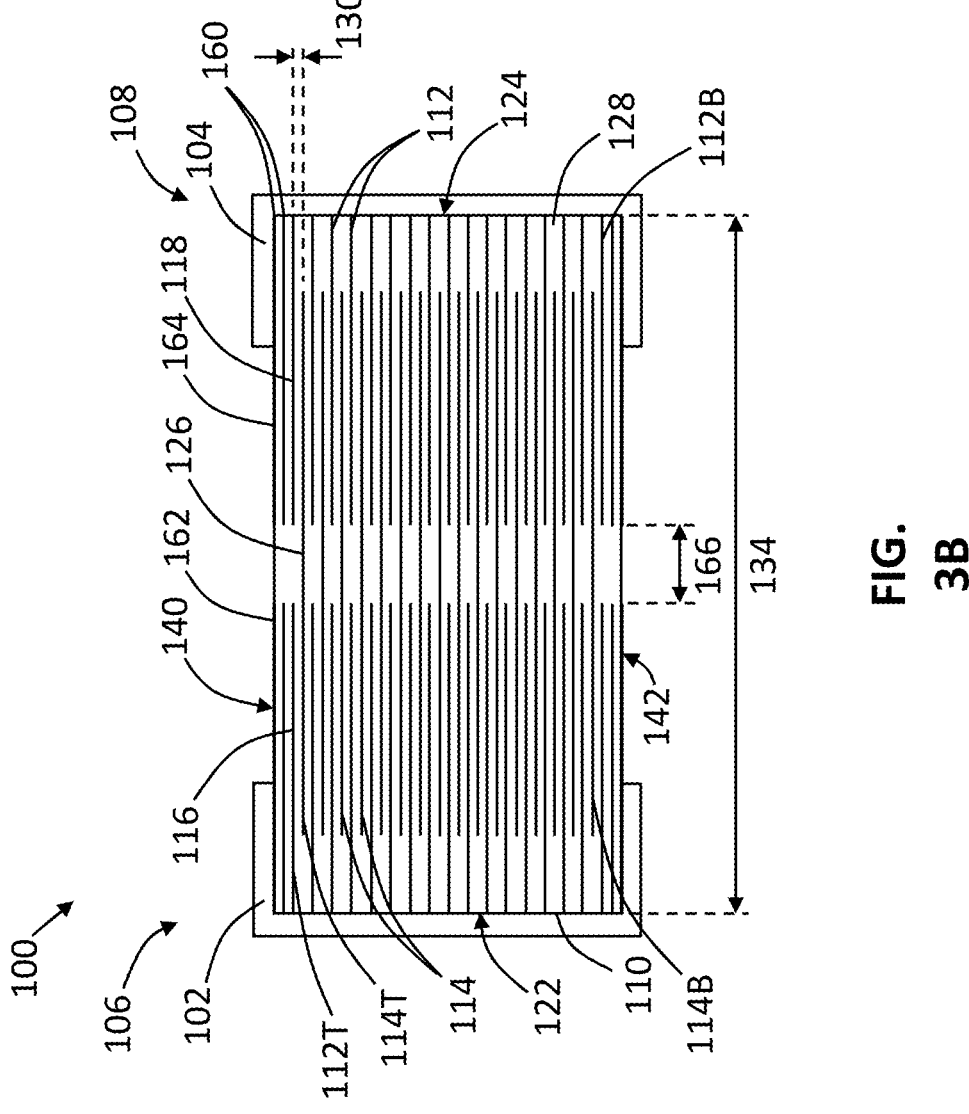
FIG. 3B illustrates a schematic cross-sectional view of the multilayer capacitor of FIG. 3A.
Figure 3B:
Figure 3C:
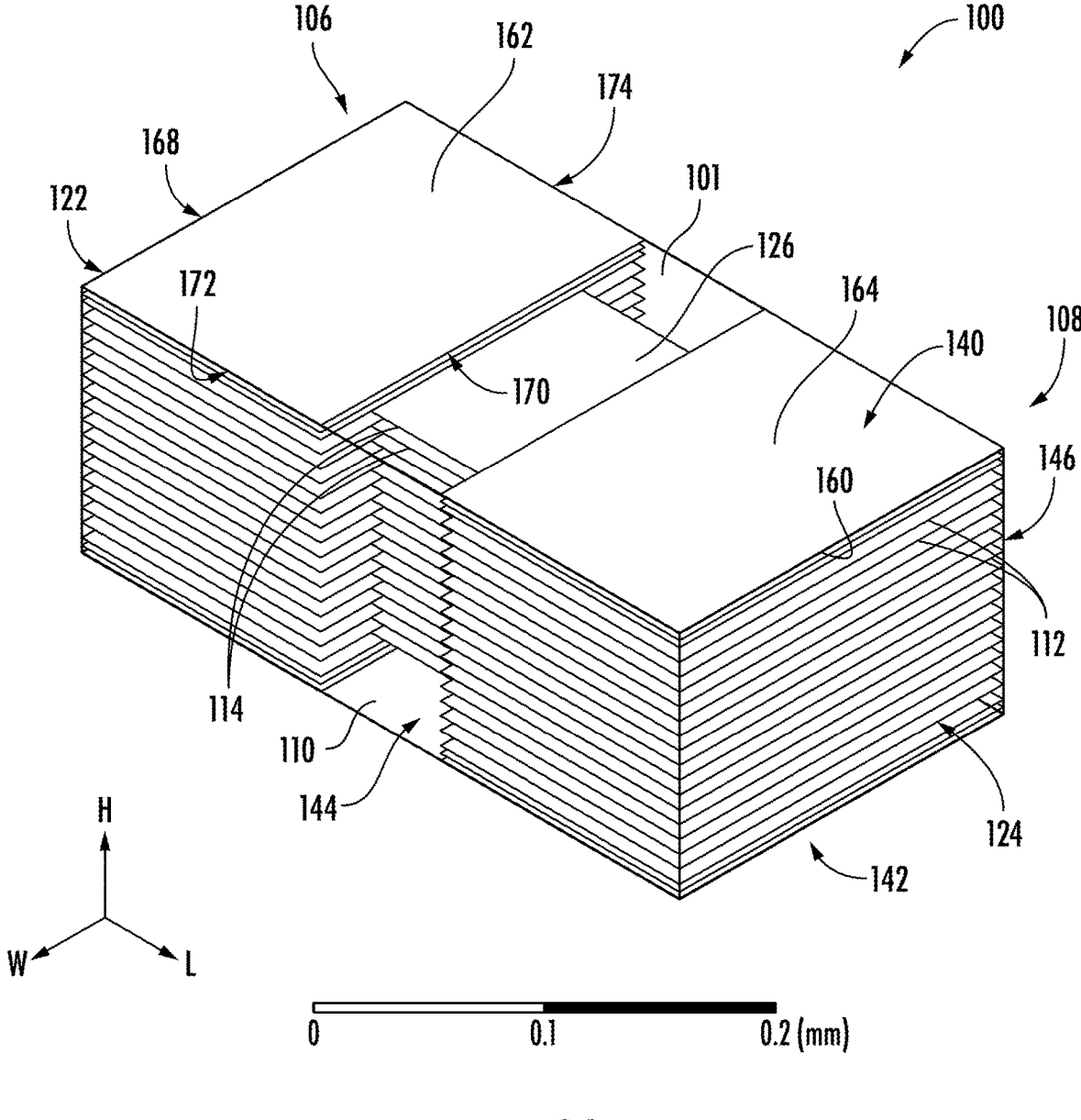
FIG. 3C illustrates a perspective view of a stack of layers forming a multilayer capacitor having a cascade configuration with at least one dummy layer and connection layers extended to an edge of the capacitor in accordance with aspects of this disclosure.
Figure 4A:
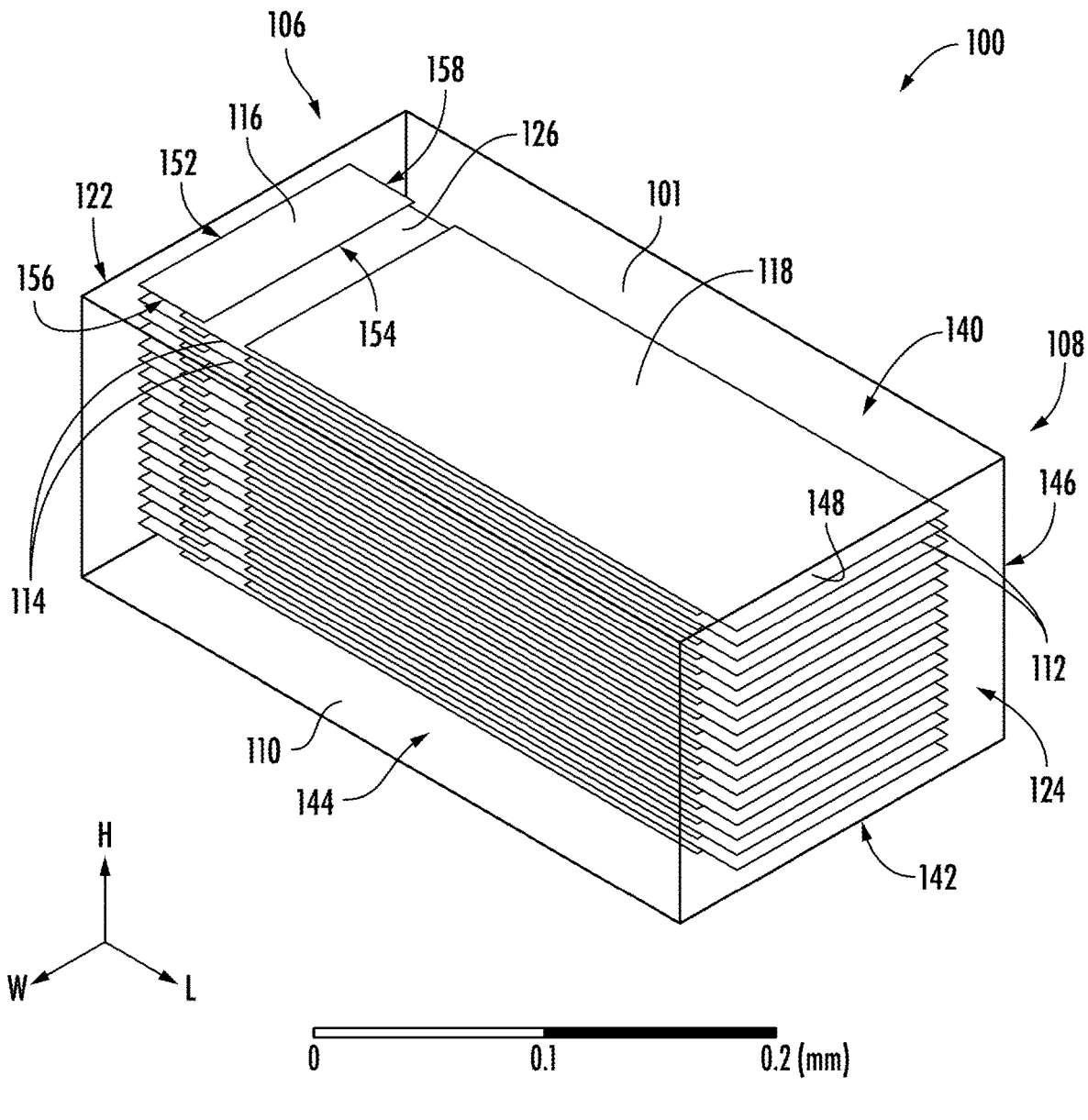
FIG. 4A illustrates a perspective view of a stack of layers forming a multilayer capacitor having a cascade configuration with a shifted design in accordance with aspects of this disclosure.
Figure 4B:
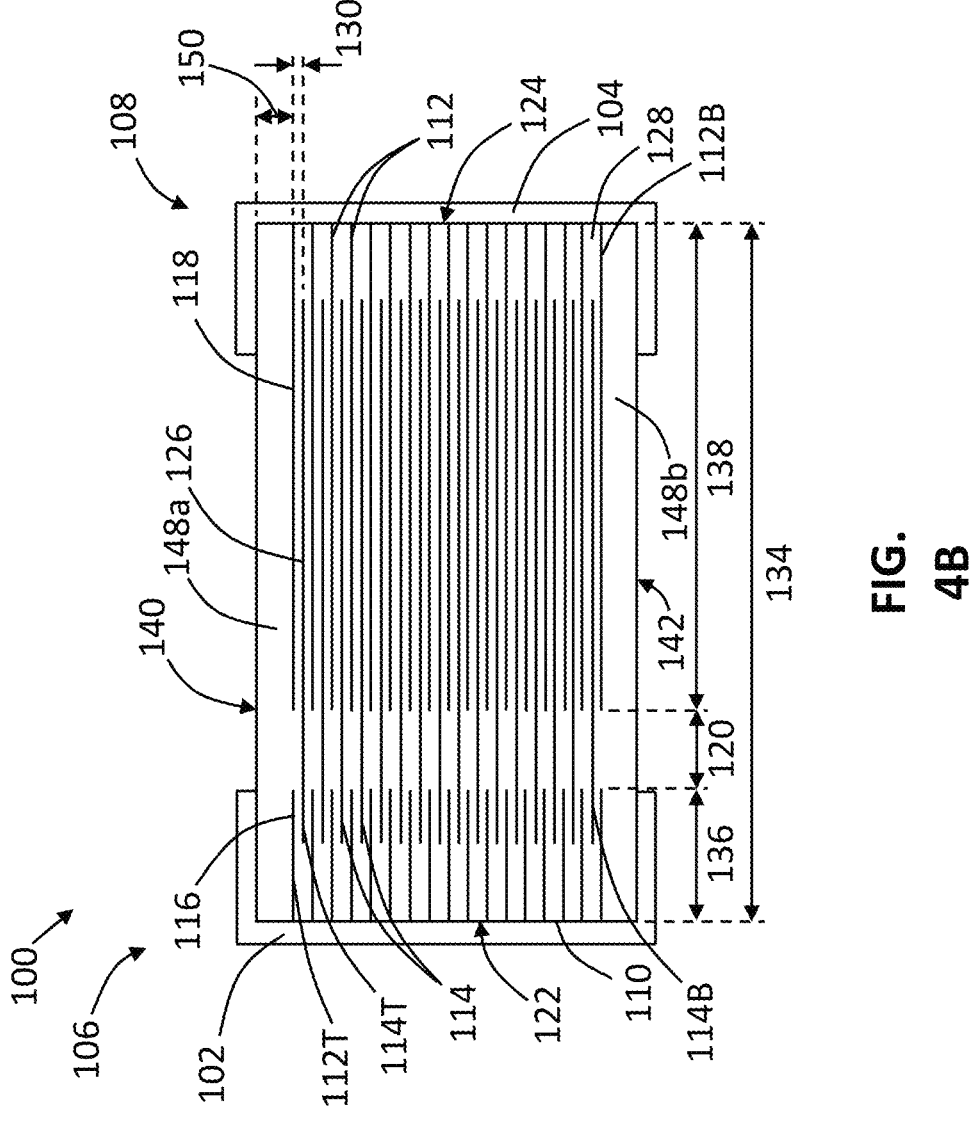
FIG. 4B illustrates a schematic cross-sectional view of the multilayer capacitor of FIG. 4A.
Figure 4B:
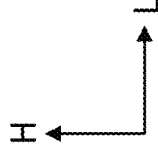
Figure 4C:
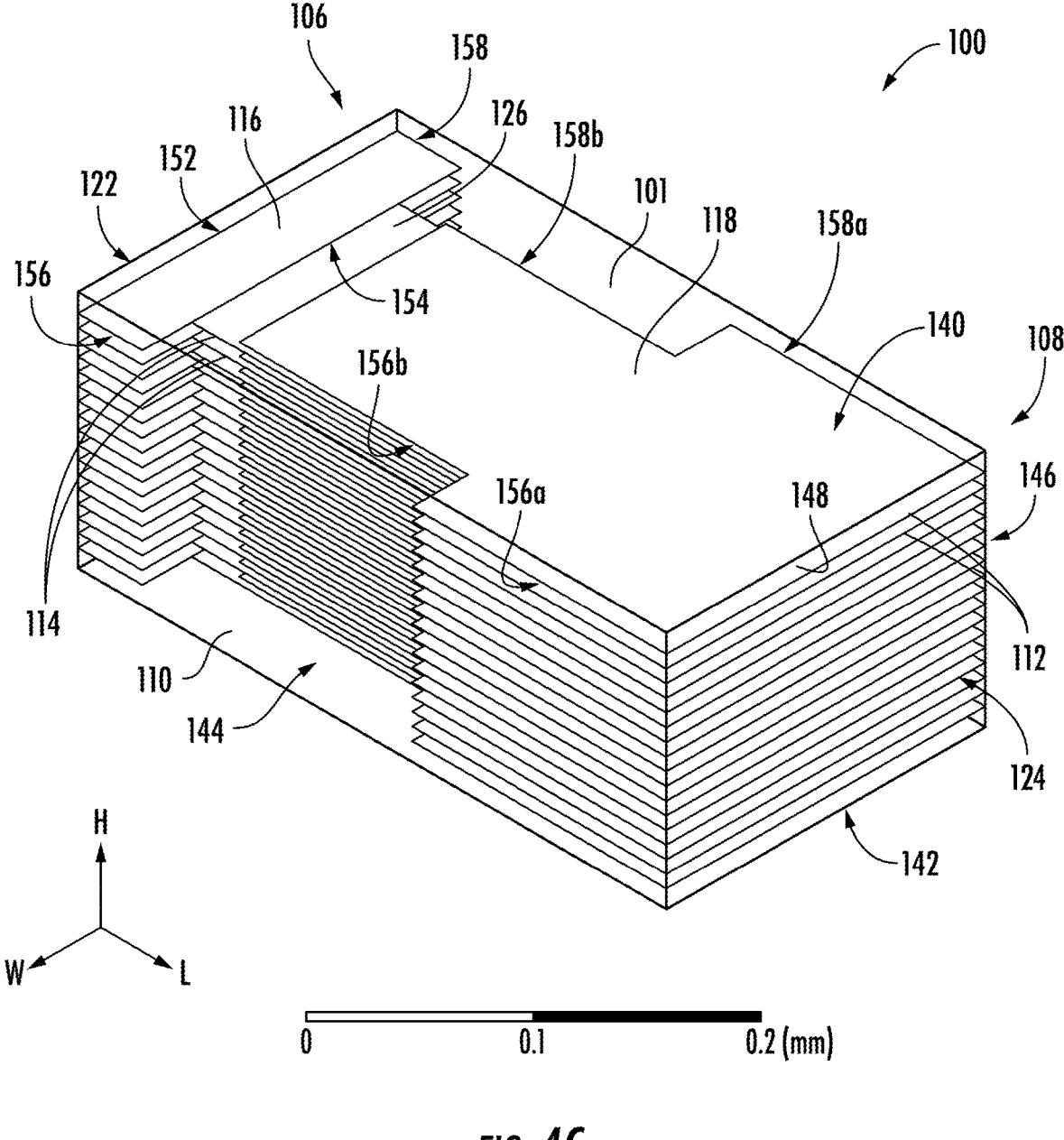
FIG. 4C illustrates a perspective view of a stack of layers forming a multilayer capacitor having a cascade configura-
Figure 5A:
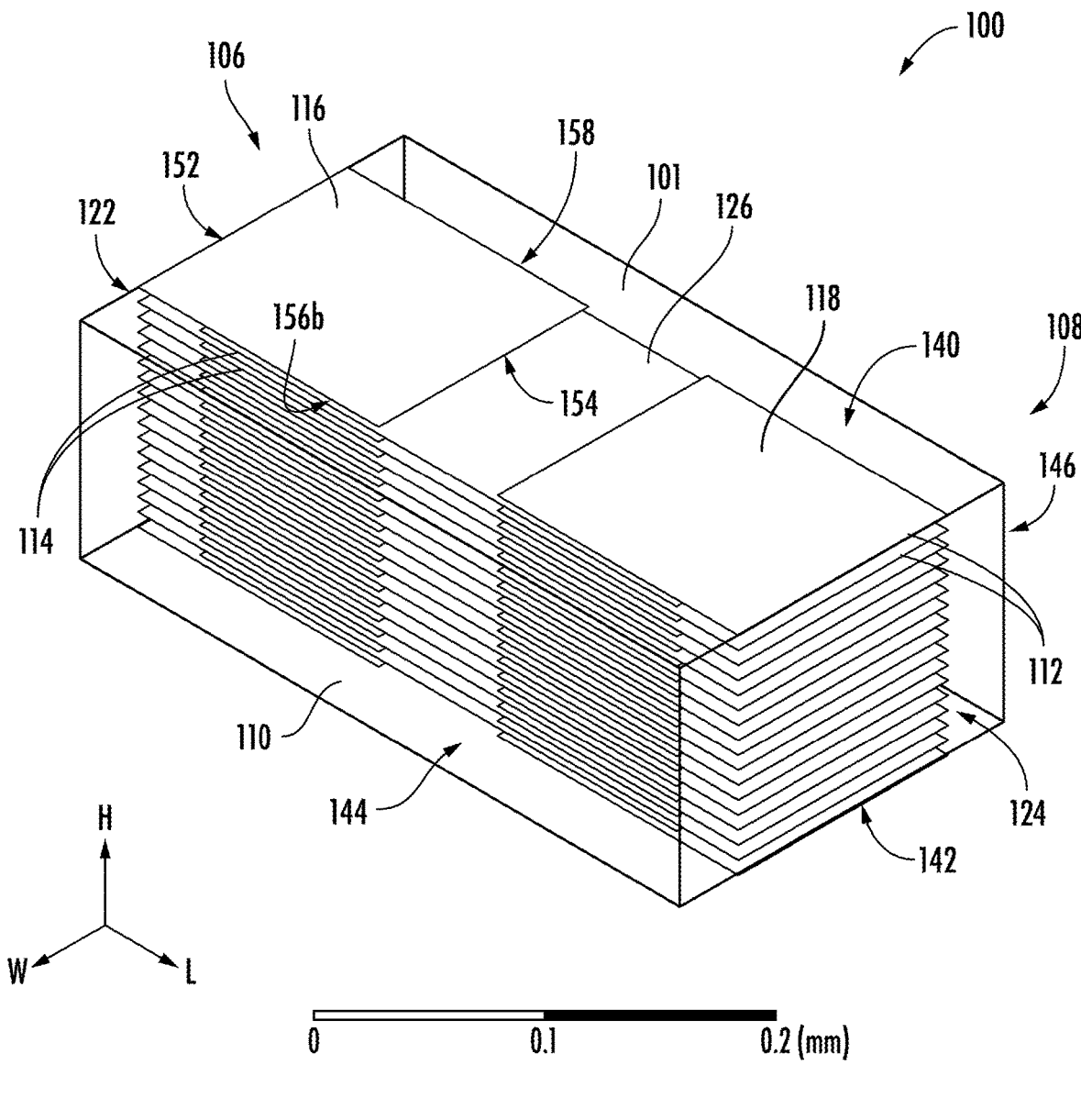
Figure 5B:
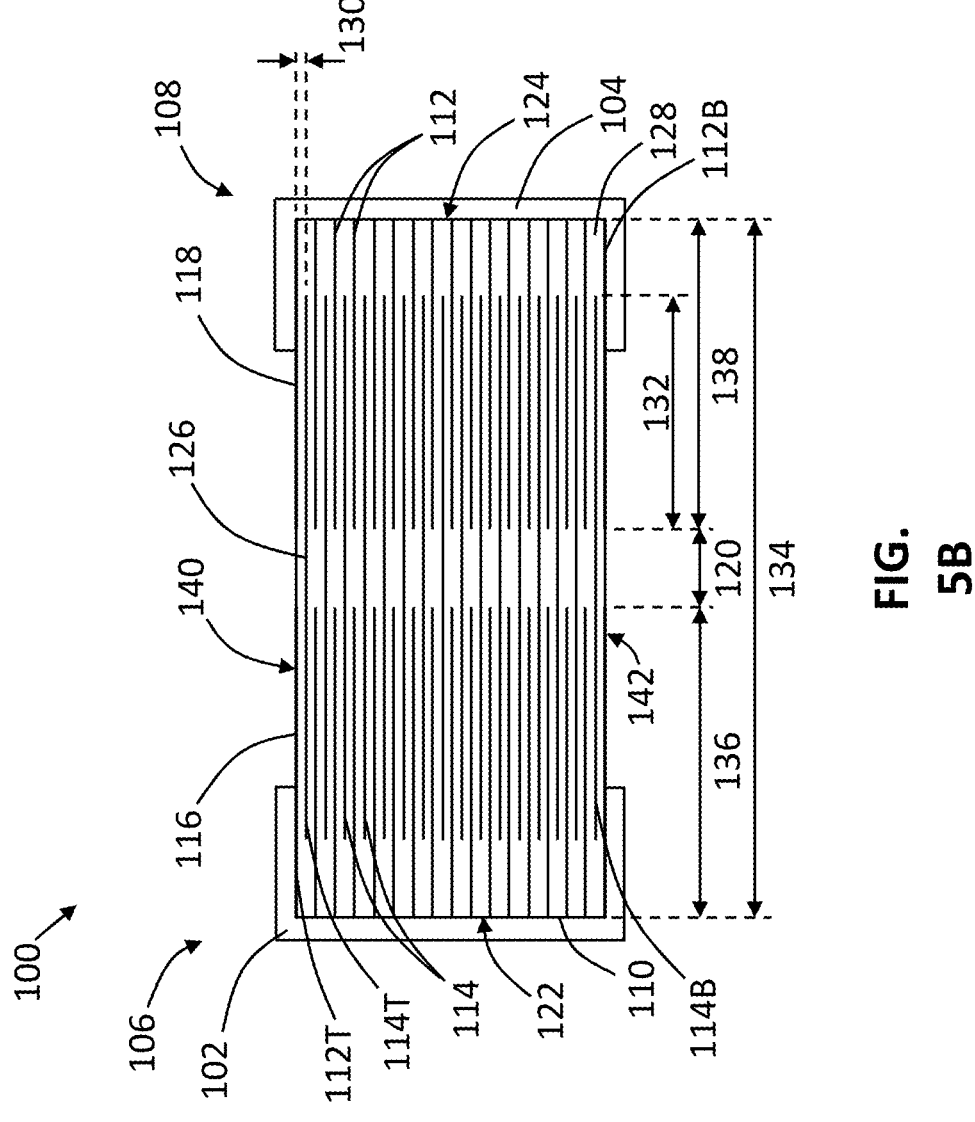
Figure 5C:
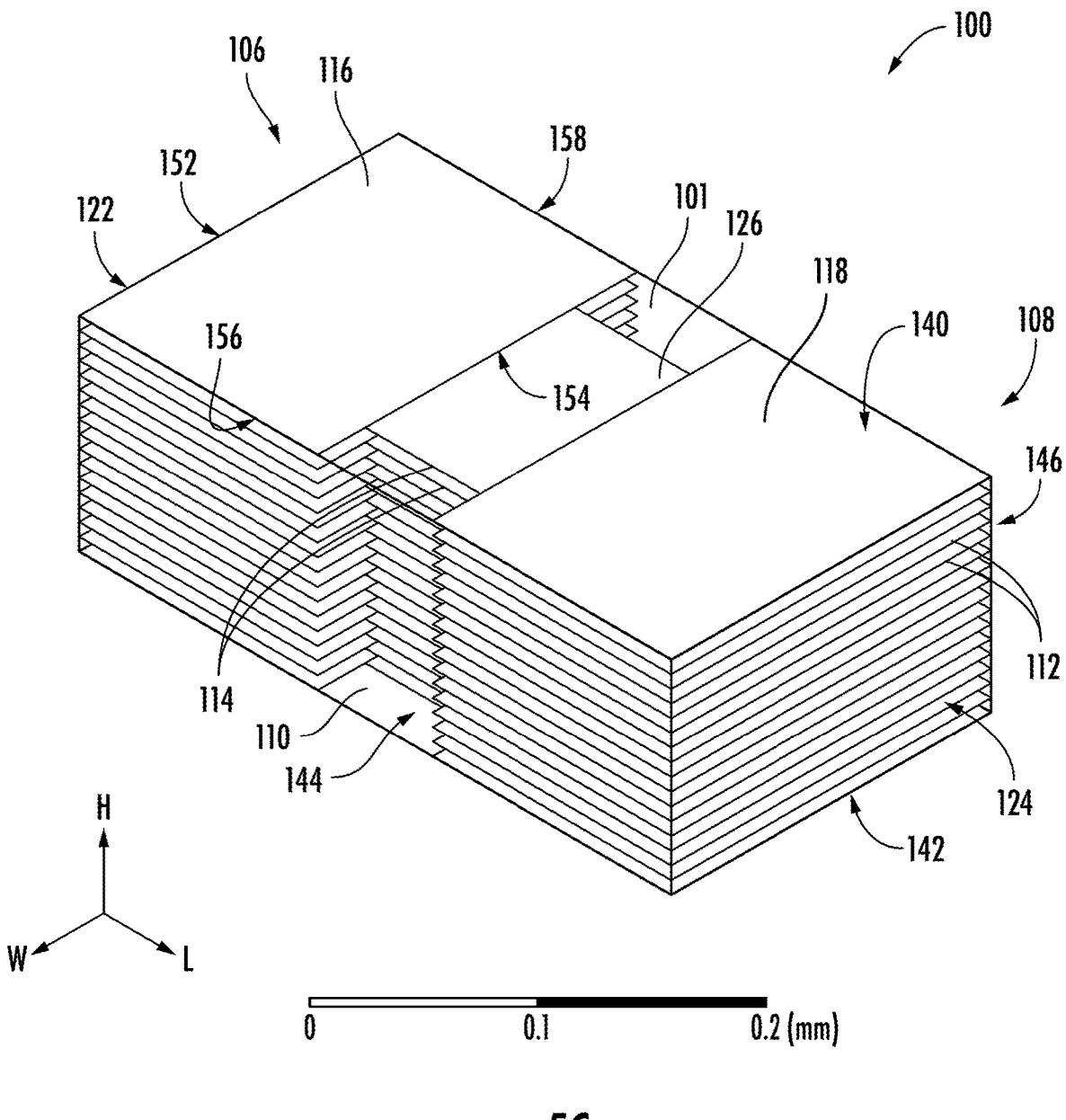
Figure 6:
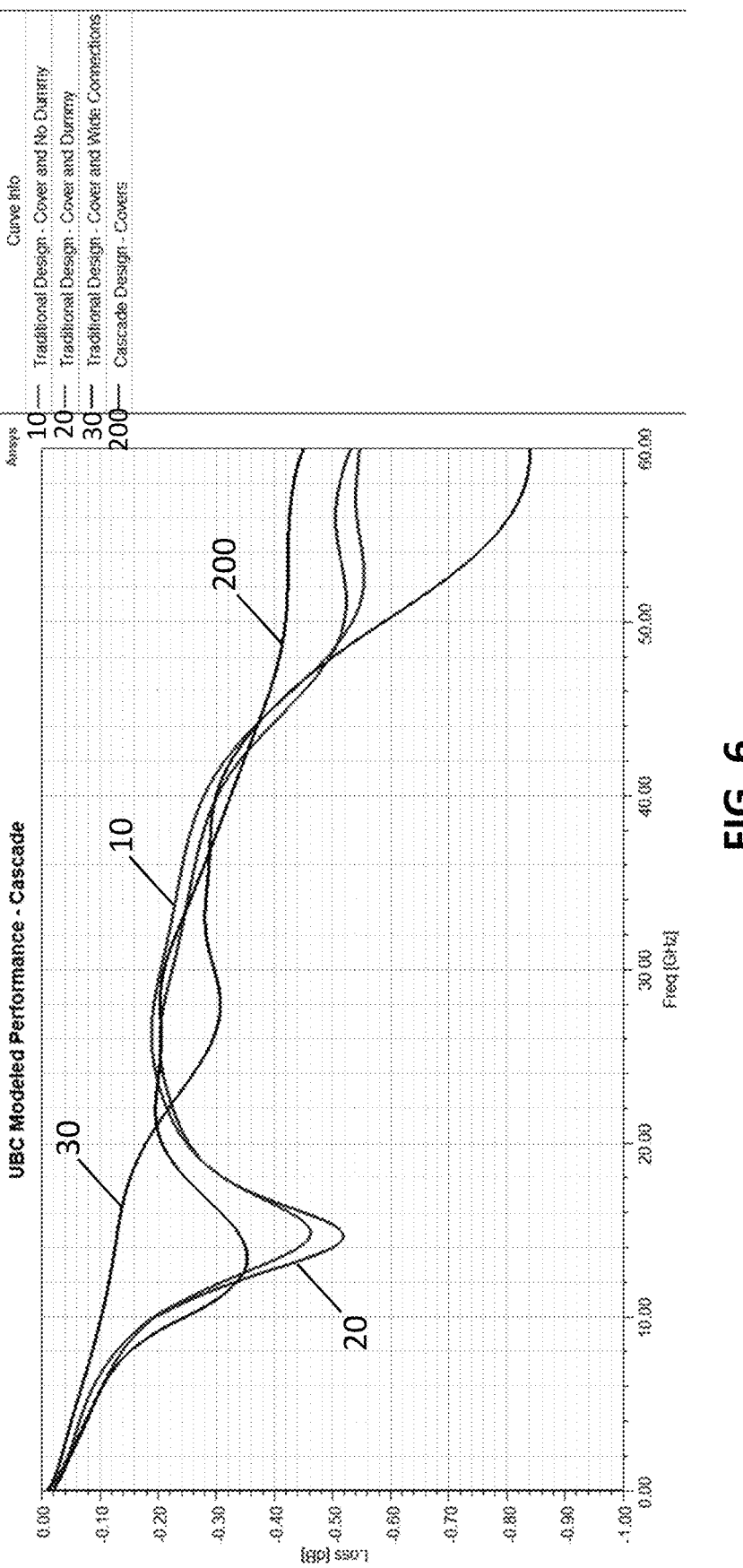
Figure 7:
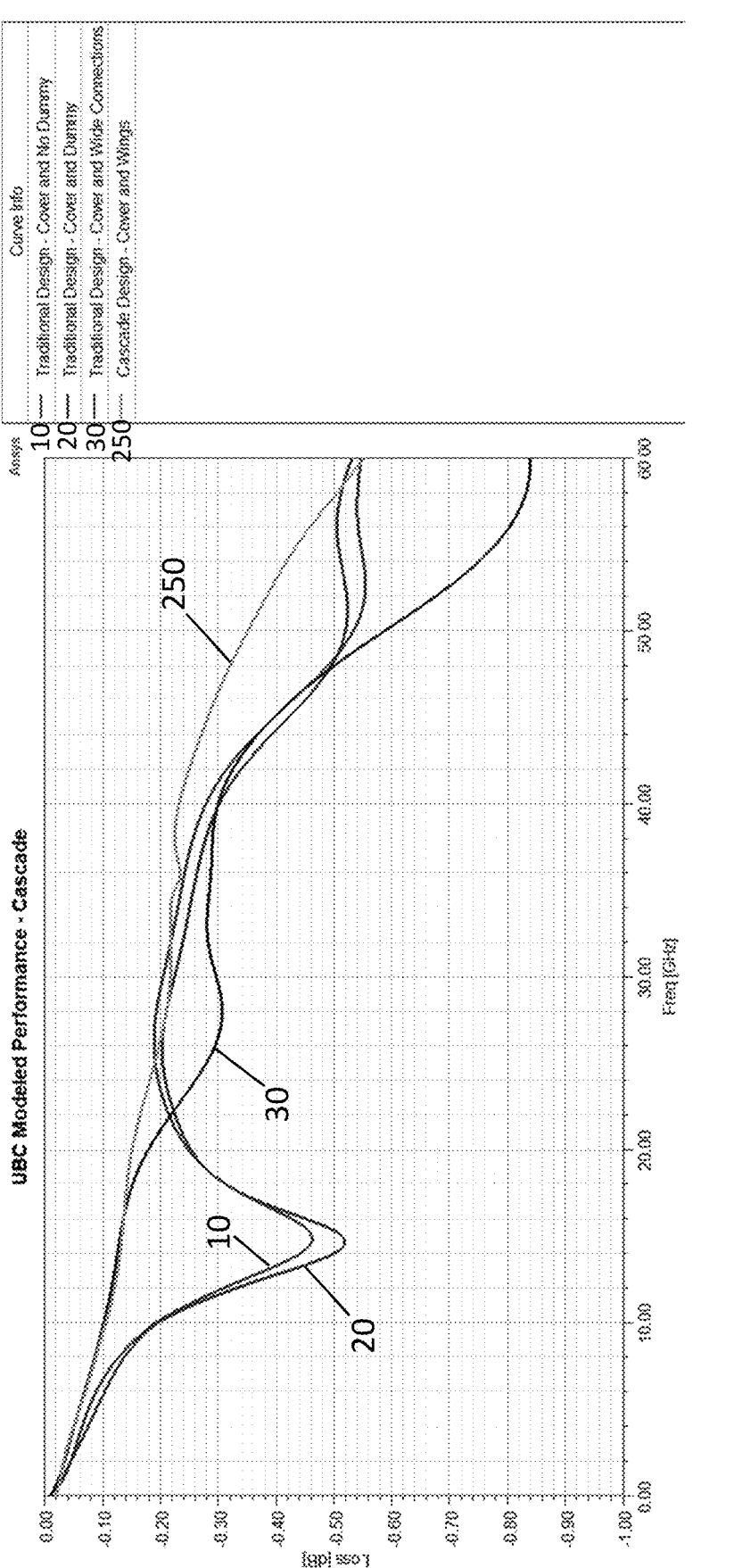
Figure 8:
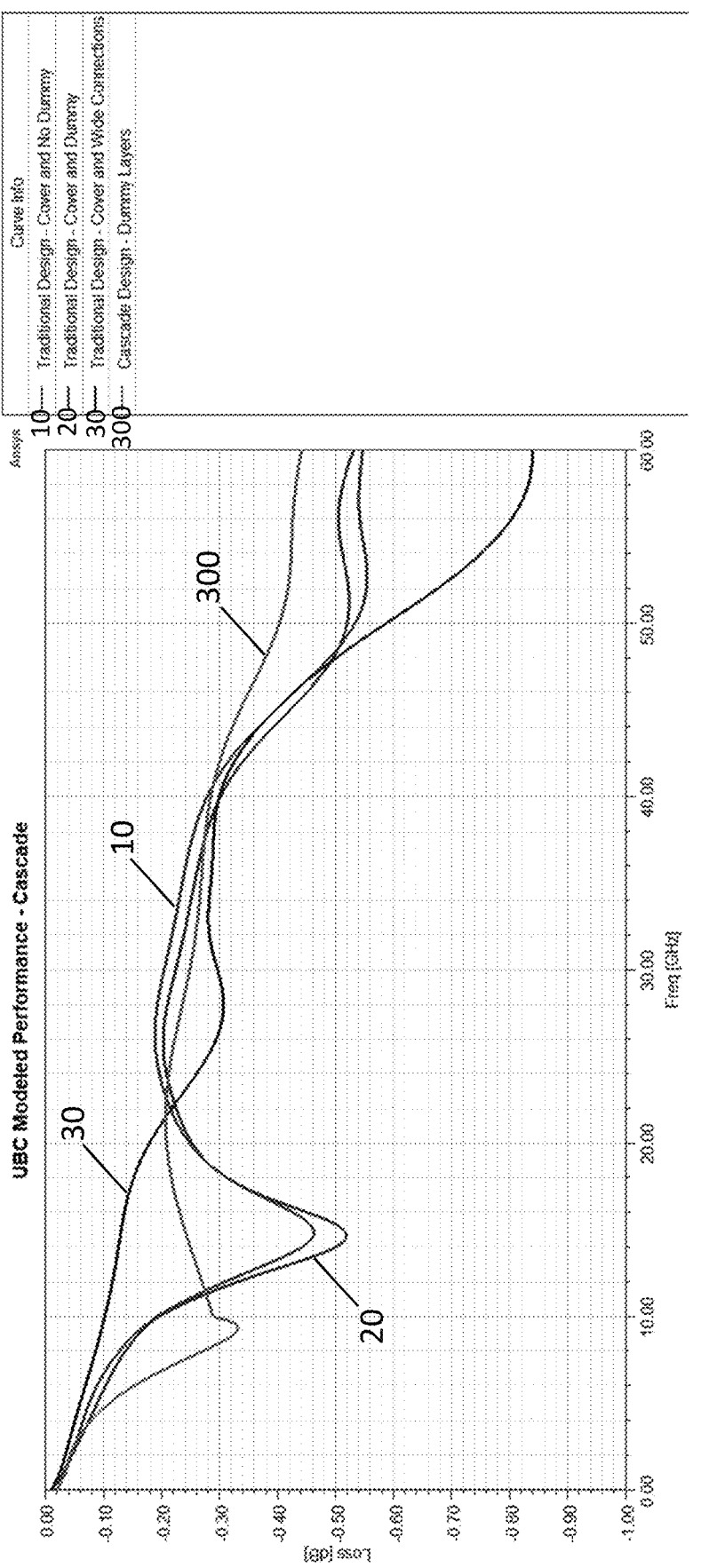
Figure 9:
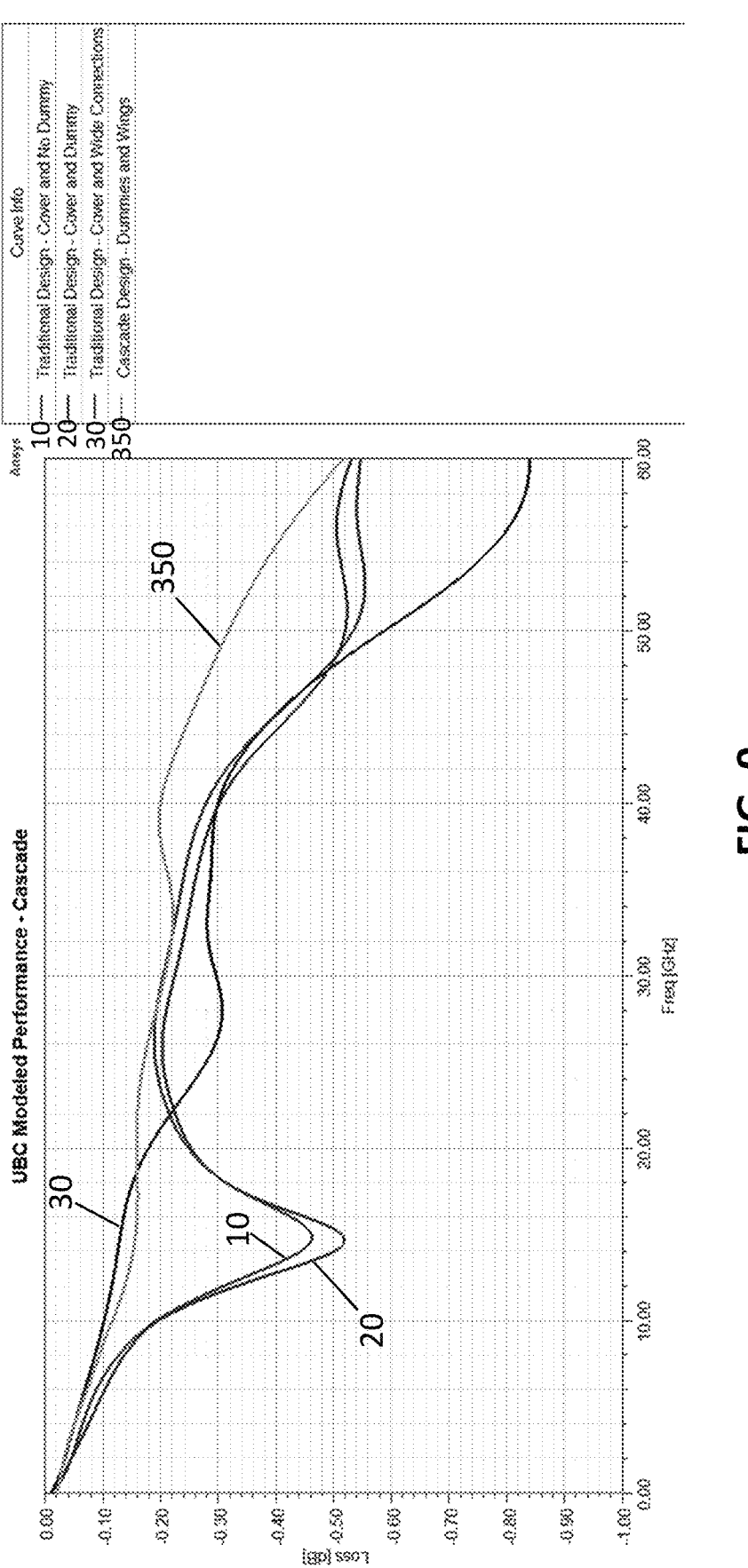
Figure 10:
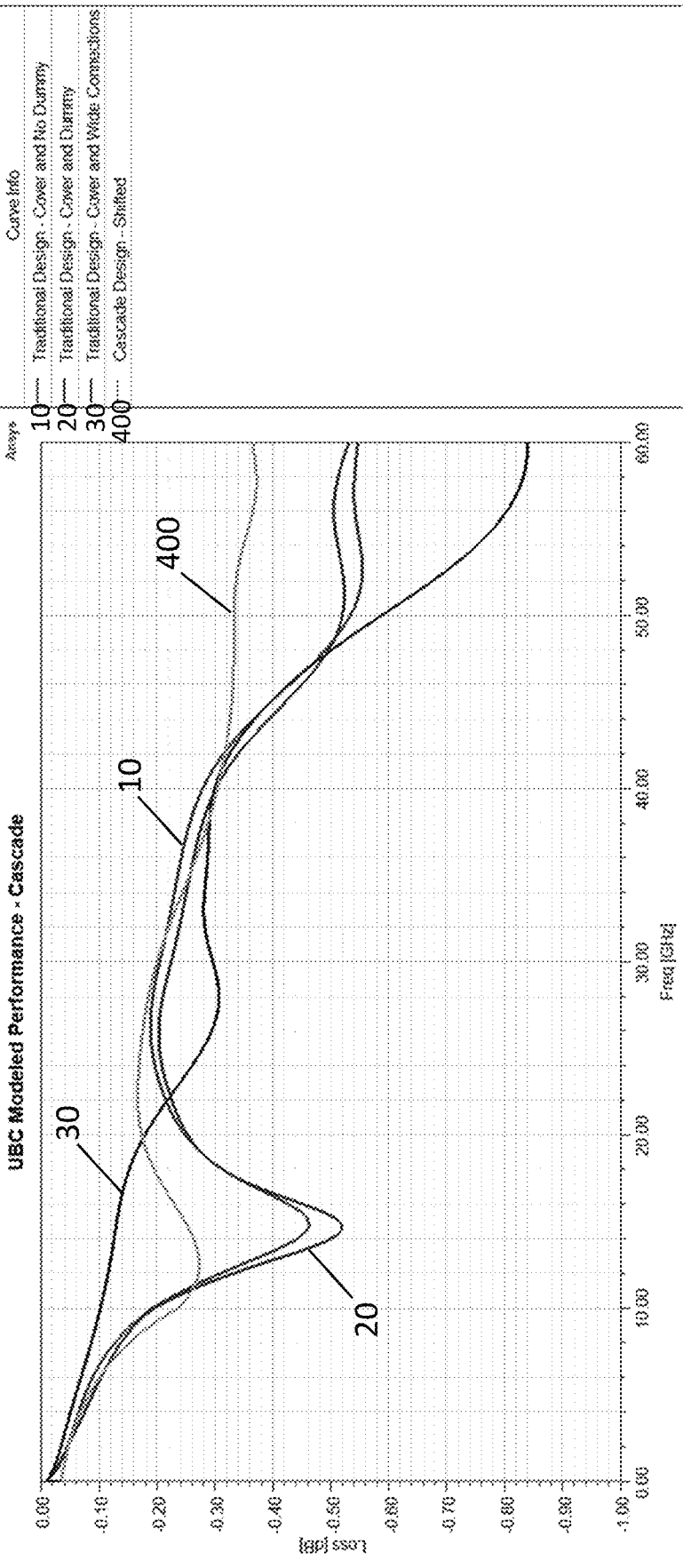
Figure 11:
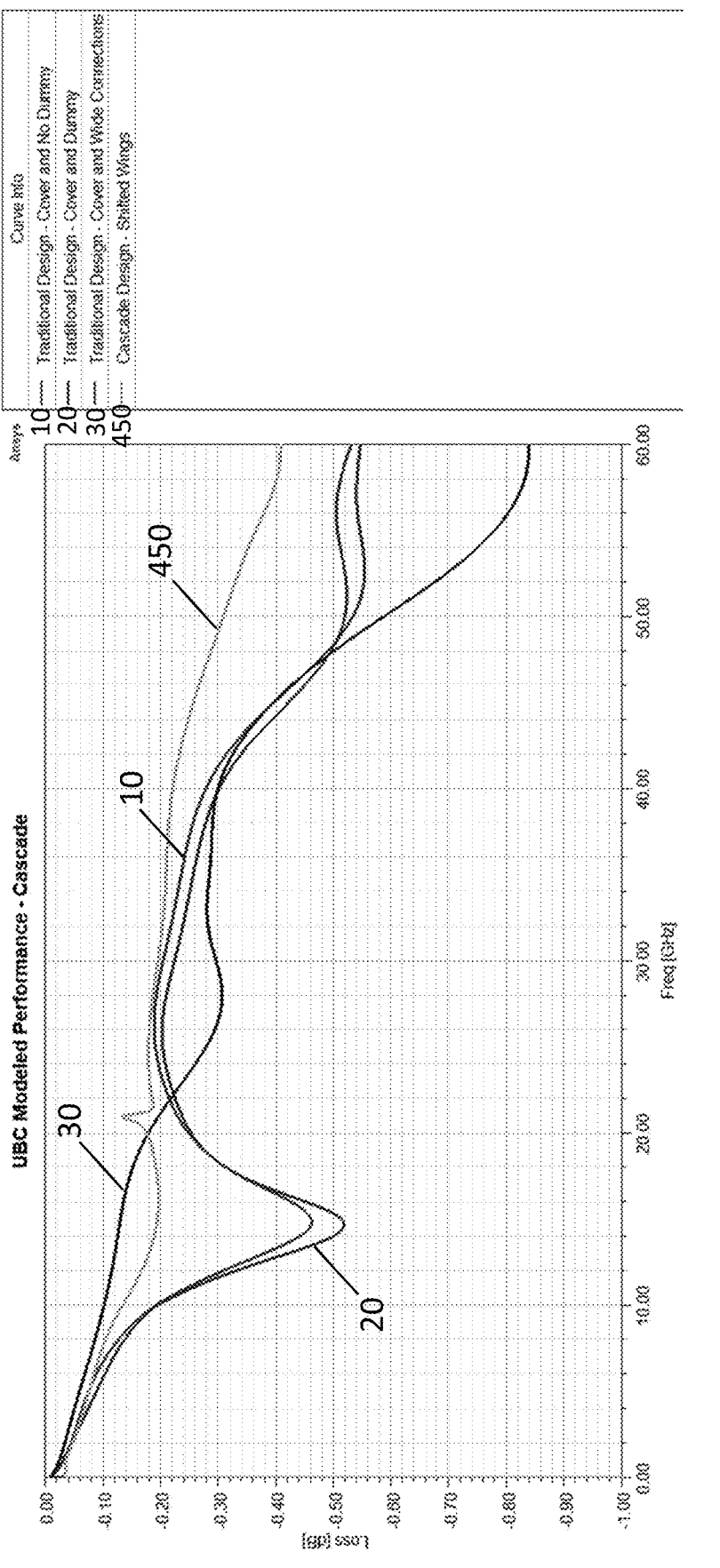
Figure 12:
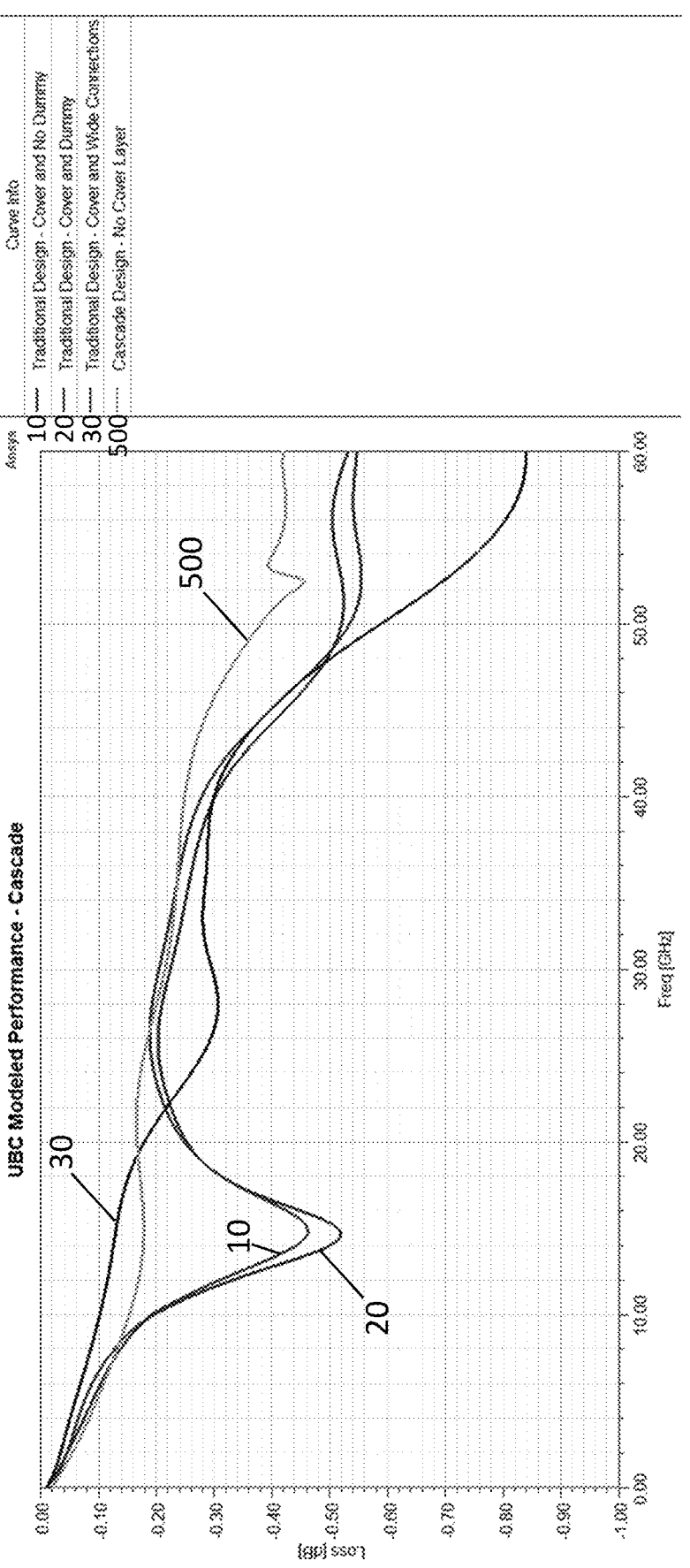
Figure 13:
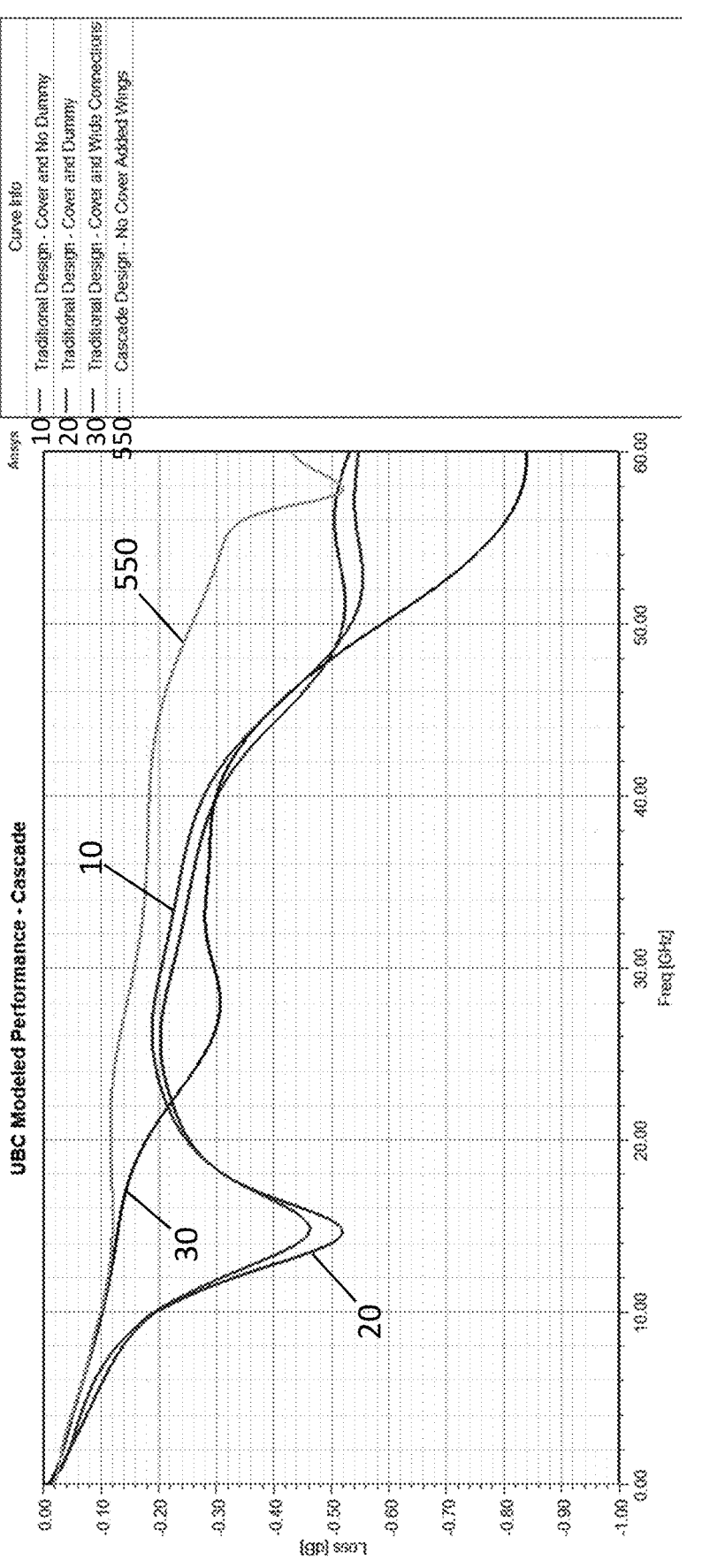
Figure 14:
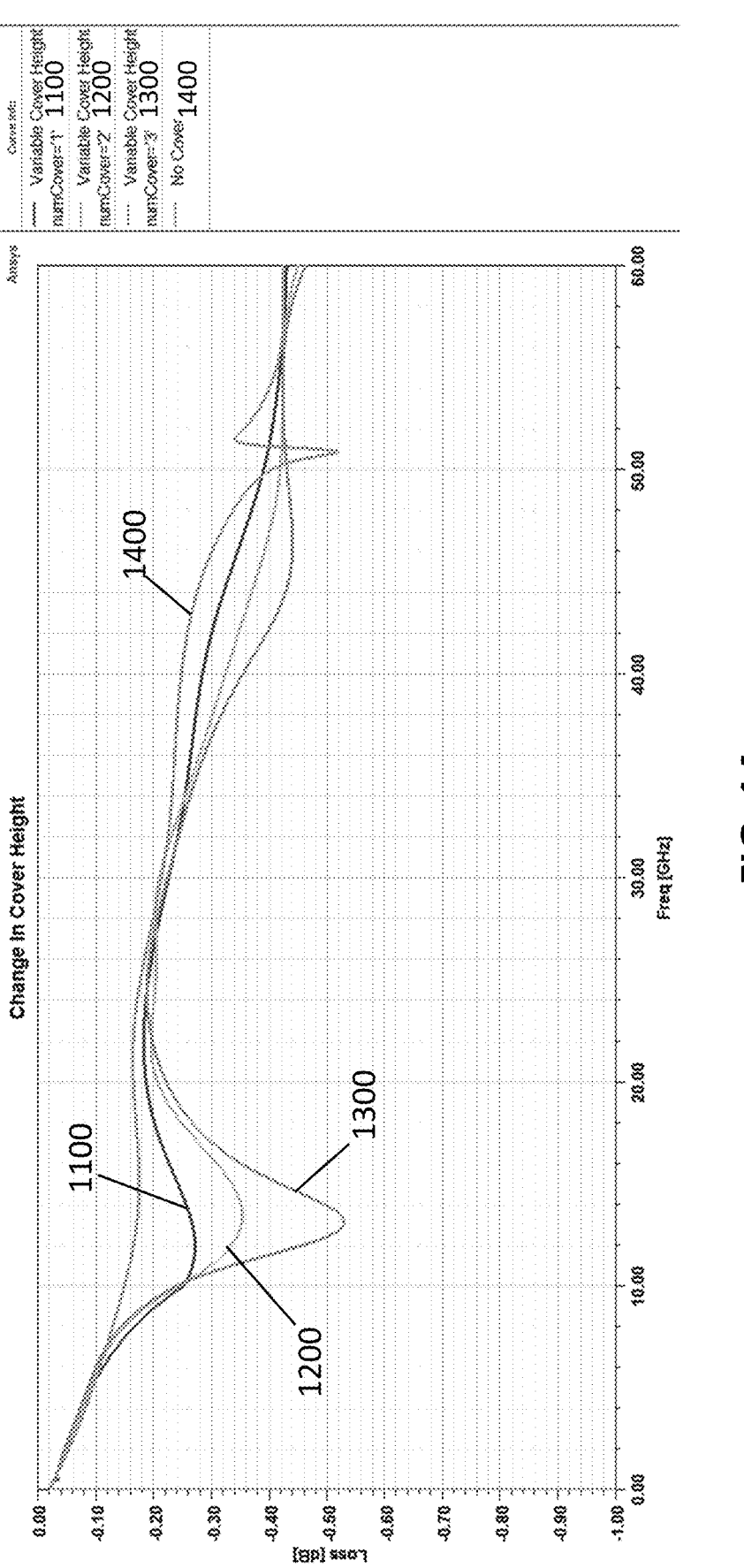

3 tion with a shifted design and connection layers extended to an edge of the capacitor in accordance with aspects of this disclosure;

FIG. 5A illustrates a perspective view of a stack of layers forming a multilayer capacitor having a cascade configuration without a cover layer in accordance with aspects of this disclosure;

FIG. 5B illustrates a schematic cross-sectional view of the multilayer capacitor of FIG. 5A;

FIG. 5C illustrates a perspective view of a stack of layers forming a multilayer capacitor having a cascade configuration without a cover layer and with connection layers extended to an edge of the capacitor in accordance with aspects of this disclosure;

FIG. 6 illustrates modeled performance of the multilayer capacitor of FIGS. 2A and 2B alongside modeled performance of various traditional multilayer capacitor designs;

FIG. 7 illustrates modeled performance of the multilayer capacitor of FIG. 2C alongside modeled performance of various traditional multilayer capacitor designs;

FIG. 8 illustrates modeled performance of the multilayer capacitor of FIGS. 3A and 3B alongside modeled performance of various traditional multilayer capacitor designs;

FIG. 9 illustrates modeled performance of the multilayer capacitor of FIG. 3C alongside modeled performance of various traditional multilayer capacitor designs;

FIG. 10 illustrates modeled performance of the multilayer capacitor of FIGS. 4A and 4B alongside modeled performance of various traditional multilayer capacitor designs;

FIG. 11 illustrates modeled performance of the multilayer capacitor of FIG. 4C alongside modeled performance of various traditional multilayer capacitor designs;

FIG. 12 illustrates modeled performance of the multilayer capacitor of FIGS. 5A and 5B alongside modeled performance of various traditional multilayer capacitor designs;

FIG. 13 illustrates modeled performance of the multilayer capacitor of FIG. 5C alongside modeled performance of various traditional multilayer capacitor designs; and FIG. 14 illustrates modeled performance of the multilayer capacitor of FIGS. 2A and 2B with various cover layer thicknesses.

Repeat use of reference characters throughout the present specification and appended drawings is intended to represent same or analogous features, electrodes, or steps of the present subject matter.

DETAILED DESCRIPTION

It is to be understood by one skilled in the art that the present disclosure is a description of exemplary embodiments only and is not intended as limiting the broader aspects of the present subject matter, which broader aspects are embodied in the exemplary constructions.

Generally speaking, the capacitor includes alternating dielectric layers and electrode layers, which may form at least a part of a body of the capacitor. By arranging the dielectric layers and the electrode layers in a stacked or laminated configuration, the capacitor may be referred to as a multilayer capacitor and in particular a multilayer ceramic capacitor, for instance when the dielectric layers include a ceramic.

The multilayer capacitor of the present disclosure is arranged in a cascade configuration, with alternating active electrode layers and floating electrode layers stacked with dielectric layers. In at least some non-cascade capacitor designs, a plurality of active electrodes may be stacked in an alternating manner so that each alternate electrode connects to opposite terminations. In cascade capacitor designs, the alternating active electrode layers may be connected to the same terminations through the use of a "cascade" configuration in which each set of active electrodes is spaced apart longitudinally rather than in a stacked manner. As such, each active electrode layer of a cascade capacitor includes a first active electrode connected to a first termination and a second active electrode connected to a second termination, with the first active electrode and the second active electrode being co-planar and spaced apart from one another in a longitudinal or lengthwise direction. More particularly, each active electrode layer of the cascade capacitor includes a first active electrode spaced apart from a second active electrode along the longitudinal or lengthwise direction to define an active electrode end gap between the first and second active electrodes. The active electrode layers are alternately stacked with floating electrode layers, with dielectric layers between each of the electrode layers, to form the multilayer capacitor.

The capacitor body may have a rectangular configuration defining first and second opposing end surfaces that are offset in a lengthwise direction, first and second opposing side surfaces that are offset in a widthwise direction, and top and bottom surfaces that are offset in a height-wise direction. The capacitor may include a first terminal adjacent the first opposing end surface and a second terminal adjacent the second opposing end surface.

As described above, the capacitor may also include a plurality of active electrode layers and a plurality of floating electrode layers that are arranged in a cascade configuration. For instance, each active electrode layer may include a first active electrode electrically connected with the first terminal and a second active electrode electrically connected with the second terminal. The first active electrode may be spaced apart from the second active electrode in the lengthwise direction to form an active electrode end gap. The plurality of floating electrode layers may each include a floating electrode. The plurality of active electrode layers may be alternately stacked with the plurality of floating electrode layers, with dielectric layers therebetween, to form the capacitor body.

The plurality of floating electrode layers may include a topmost floating electrode layer that is the closest of the plurality of floating electrode layers to the top surface of the capacitor and a bottommost floating electrode layer that is the closest of the plurality of floating electrode layers to the bottom surface of the capacitor. The plurality of active electrode layers may be an odd number of layers such that a topmost active electrode layer is disposed between the topmost floating electrode layer and the top surface of the capacitor, and a bottommost active electrode layer is disposed between the bottommost floating electrode layer and the bottom surface of the capacitor.

Without being limited to theory, the above-described cascade configuration may facilitate increased energy or power handling capabilities. For example, the floating electrodes may improve heat conduction in the lengthwise direction, thereby improving heat dissipation. During a large current or energy surge, heat is generated as current flows through the dielectric layers. The floating electrode layers may facilitate improved heat flow from the middle of the dielectric layers outward toward the terminals, where the heat may be more easily dissipated. As a result, the capacitor may be capable of handling a greater energy surge without overheating. Thus, the floating electrode layers may improve the energy handling capabilities of the capacitor.

Additionally, regardless of the particular configuration employed, the present inventors have discovered that through selective control over the configuration of the electrodes and/or the outermost dielectric layer(s), a multilayer capacitor can be achieved that exhibits excellent energy handling capabilities with improved performance characteristics. For example, the capacitor may exhibit an insertion loss that is greater than about −0.60 dB from about 0 GHz to about 60 GHz. As another example, the capacitor may exhibit an insertion loss that is greater than about −0.35 dB over a frequency range of about 10 GHz to about 40 GHz.

In some embodiments, the capacitor may include a cover layer that defines at least one of the top surface or bottom surface of the capacitor body. That is, the cover layer is disposed between the topmost active electrode layer and the top surface of the capacitor body, the bottommost active electrode layer and the bottom surface of the capacitor body, or both. For example, in some embodiments, a first cover layer is disposed over the topmost active electrode layer to define the top surface of the capacitor body and a second cover layer is disposed below the bottommost active electrode layer to define the bottom surface of the capacitor body. A cover layer may be formed from one or more layers of dielectric material and may be free of electrodes.

The cover layer(s) may have a cover layer thickness in the height-wise direction that is at least equal to a thickness of a respective one active electrode layer of the plurality of active electrode layers. A cover layer thickness or height in the height-wise direction may be varied based on the desired performance of a given capacitor. For instance, a thicker cover layer may be beneficial for capacitors utilized in higher voltage applications; the thicker cover layer can increase or help ensure reliability of the part. As another example, a thinner cover layer can improve frequency performance.

In some embodiments, the active electrodes may define "wings." For example, rather than being spaced apart from the opposing side surfaces of the capacitor, the first active electrode and/or the second active electrode of an active electrode layer may extend to each of the first opposing side surface and the second opposing side surface, such that at least a portion of the first and/or second active electrodes extends along each of the first and second side surfaces of the capacitor body. Such extensions to the sides of the capacitor, which extend or enlarge a respective electrode in the widthwise direction, may be referred to as "wings." In some embodiments, each of the first and second active electrode of each active electrode layer extend to the side surfaces of the capacitor body, i.e., all active electrodes extend to the side surfaces of the capacitor body, but in other embodiments, not every first active electrode and/or every second active electrode extends to the side surfaces of the capacitor body, i.e., only a portion of the first active electrodes and/or second active electrodes extends to the side surfaces of the capacitor body.

In some embodiments, the capacitor may include one or more dummy electrode layers. For instance, at least one dummy electrode layer may be disposed above the topmost active electrode layer and/or at least one dummy electrode layer may be disposed below the bottommost active electrode layer. Dummy electrodes may improve mechanical adhesion of the external terminals to the capacitor without substantially contributing to the electrical properties of the capacitor. For example, in some embodiments, the dummy electrodes may be shorter in the lengthwise direction than the active electrodes, although in other embodiments the dummy electrodes may be generally equal in length to the active electrodes. Dummy electrodes may be formed in any dielectric layer to improve electrical connection with the external terminals and/or to improve formation of the external terminals (e.g., through electroless and/or electrolytic plating, such as by using a fine copper termination process). However, at least one dummy electrode layer may be formed above and/or below the outermost active electrode layers to improve the performance characteristics of the capacitor as described herein.

Each dummy electrode layer may include a first dummy electrode electrically connected with the first terminal and a second dummy electrode electrically connected with the second terminal. The first dummy electrode may be spaced apart from the second dummy electrode in the lengthwise direction by a dummy electrode end gap.

A dummy electrode disposed in the stack of electrode layers and dielectric layers above the topmost active electrode layer may define the top surface of the capacitor body. Similarly, a dummy electrode disposed in the stack of electrode layers and dielectric layers below the bottommost active electrode layer may define the bottom surface of the capacitor body.

In some embodiments, the one or more dummy electrodes may define "wings" similar to the wings described above with respect to the active electrodes. For instance, in some embodiments, the first dummy electrode and/or the second dummy electrode of at least one dummy electrode layer may extend to each of the first opposing side surface and the second opposing side surface of the capacitor body, rather than being spaced apart from the opposing side surfaces. Such extensions of the dummy electrode(s) to the sides of the capacitor, which extend or enlarge a respective electrode in the widthwise direction, may be referred to as "wings." In some embodiments, each dummy electrode may extend to the first side surface and the second side surface of the capacitor body, but in other embodiments, only a portion of the first dummy electrodes and/or the second dummy electrodes may extend to the side surfaces of the capacitor body. In some embodiments, dummy electrode(s) with wings may be used with one or more active electrodes that also define wings, i.e., with one or more first and/or second active electrodes of the active electrode layers that extend to the first and second side surfaces of the capacitor body.

In some embodiments, the first active electrode and the second active electrode of a respective one active electrode layer may have the same length in the lengthwise direction. That is, each of the first active electrode and the second active electrode of an active electrode layer may have a length in the lengthwise direction, and the length of the first active electrode may be the same as the length of the second active electrode. However, in other embodiments, one of the first active electrode or the second active electrode of a given active electrode layer may be longer than the other of the first active electrode or the second active electrode. Stated differently, in some embodiments, the first active electrode is longer than the second active electrode in the lengthwise direction, or the second active electrode is longer than the first active electrode in the lengthwise direction. Such unequal electrode length design may be referred to as a "shifted" design.

For example, the first active electrode of a respective one active electrode layer may have a first length in the lengthwise direction and the second active electrode of the respective one active electrode layer may have a second length in the lengthwise direction. In some embodiments, the first length may be equal to the second length. In other embodiments, the first length may be longer than the second length. For instance, a ratio of the first length to the second length may be within a range of about 1.5 to about 10. In still other embodiments, the second length may be longer than the first length, e.g., a ratio of the second length to the first length may be within a range of about 1.5 to about 10.

A shifted electrode design may also incorporate wings as described herein. More particularly, an active electrode layer having one of the first active electrode or the second active electrode longer than the other of the first or second active electrode also may have the first active electrode and/or the second active electrode extending to the first and second opposing side surfaces of the capacitor body. As one example, a respective one active electrode layer of the plurality of active electrode layers of the capacitor may have a first active electrode that is longer than a second active electrode in the lengthwise direction, with the first and second active electrodes being co-planar with one another and spaced apart from one another in the lengthwise direction, and both the first and second active electrodes may extend to the first and second side surfaces of the capacitor.

As described above, the capacitor can include a cover layer, which can be dielectric material having a cover layer thickness or height in the height-wise direction and which defines the top surface and/or bottom surface of the capacitor. In some embodiments, the capacitor may not include a cover layer. For example, the topmost active electrode layer may define the top surface of the capacitor and/or the bottommost active electrode layer may define the bottom surface of the capacitor. In such embodiments, the first active electrode and/or the second active electrode of the topmost and/or the bottommost active electrode layer may define "wings" as described above. For example, the first active electrode, the second active electrode, or both of the topmost active electrode layer, the bottommost active electrode layer, or both may extend to the side surfaces of the capacitor body, rather than being spaced apart from the side surfaces of the capacitor body. As another example of a capacitor without a cover layer, a dummy electrode layer may define the top surface and/or bottom surface of the capacitor.

A multilayer capacitor as described herein may exhibit a low insertion loss across a broad range of frequencies. In general, the insertion loss is the loss of power through the capacitor and may be measured using any method generally known in the art. For example, over a frequency range of about 0 GHz to about 60 GHz, the capacitor may exhibit an insertion loss that is greater than about –0.60 dB, in some embodiments greater than about –0.55 dB, in some embodiments greater than about –0.50 dB, in some embodiments greater than about –0.45 dB, and in some embodiments greater than about –0.40 dB. In some embodiments, over a frequency range of about 0 GHz to about 40 GHz, the capacitor may exhibit an insertion loss that is greater than about –0.40 dB, in some embodiments greater than about –0.35 dB, in some embodiments greater than about –0.30 dB, and in some embodiments greater than about –0.25 dB.

In some embodiments, at a frequency of about 10 GHz, the capacitor may exhibit an insertion loss that is greater than about –0.30 dB, in some embodiments greater than about –0.25 dB, in some embodiments greater than about –0.20 dB, and in some embodiments greater than about –0.15 dB.

At a frequency of about 20 GHz, the capacitor may exhibit an insertion loss that is greater than about –0.22 dB, in some embodiments greater than about –0.20 dB, in some embodiments greater than about –0.18 dB, in some embodiments greater than about –0.16 dB, and in some embodiments greater than about –0.14 dB.

At a frequency of about 30 GHz, the capacitor may exhibit an insertion loss that is greater than about –0.30 dB, in some embodiments greater than about –0.28 dB, in some embodiments greater than about –0.26 dB, in some embodiments greater than about –0.24 dB, and in some embodiments greater than about –0.22 dB.

At a frequency of about 40 GHz, the capacitor may exhibit an insertion loss that is greater than about –0.40 dB, in some embodiments greater than about –0.35 dB, in some embodiments greater than about –0.30 dB, and in some embodiments greater than about –0.25 dB.

A ratio of the active electrode end gap to the floating electrode gap may be greater than about two (2). For example, in some embodiments, the ratio may range from about 2 to about 50, in some embodiments from about 2 to about 30, and in some embodiments from about 3 to about 25.

The active electrode end gap may range from about 100 microns to about 1000 microns, and in some embodiments from about 200 microns to about 800 microns. The floating electrode gap may range from about 15 microns to about 300 microns, and in some embodiments from about 25 microns to about 150 microns.

The first active electrode and/or second active electrode of a respective one active electrode layer may overlap the floating electrode of an adjacent floating electrode layer in the lengthwise direction along an overlap distance. The capacitor body may have a length in the lengthwise direction between the first terminal and the second terminal, which may also be a length of the active electrode layers between the first terminal and the second terminal. An overlap ratio may be defined as a length of the capacitor body divided by the overlap distance. In some embodiments, the overlap ratio may be less than about five (5). In other embodiments, however, the overlap ratio can be greater than about five (5).

The overlap ratio may be an indication of the capacitance of the capacitor. The overlap ratio can be controlled to improve tolerance of capacitance, the number of layers, and/or the dielectric thickness. The dielectric thickness may relate to the cover layer thickness. As described elsewhere herein, the cover layer thickness (e.g., the dielectric thickness) may be minimized to improve RF performance. Thus, in at least some embodiments, the overlap ratio may be selected to minimize the cover layer thickness and thereby improve the performance of the capacitor at certain frequencies.

In general, the dielectric layers are typically formed from a material having a relatively high dielectric constant (K), such as from about 10 to about 40,000 in some embodiments from about 50 to about 30,000, and in some embodiments, from about 100 to about 20,000.

In this regard, the dielectric material may be a ceramic. The ceramic may be provided in a variety of forms, such as a wafer (e.g., pre-fired) or a dielectric material that is co-fired within the device itself. In some embodiments, the dielectric layers of the capacitor may be pressed together and sintered to form a unitary structure.

Particular examples of the type of high dielectric material include, for instance, NPO (COG) (up to about 100), X7R (from about 3,000 to about 7,000), X7S, Z5U, and/or Y5V materials. It should be appreciated that the aforementioned materials are described by their industry-accepted definitions, some of which are standard classifications established by the Electronic Industries Alliance (EIA), and as such should be recognized by one of ordinary skill in the art. For instance, such material may include a ceramic. Such materials may include a perovskite, such as barium titanate and related solid solutions (e.g., barium-strontium titanate, barium calcium titanate, barium zirconate titanate, barium strontium zirconate titanate, barium calcium zirconate titanate, etc.), lead titanate and related solid solutions (e.g., lead zirconate titanate, lead lanthanum zirconate titanate), sodium bismuth titanate, and so forth. In one particular embodiment, for instance, barium strontium titanate ("BSTO") of the formula $Ba_xSr_{1-x}TiO_3$ may be employed, wherein x is from 0 to 1, in some embodiments from about 0.15 to about 0.65, and in some embodiments, from about from 0.25 to about 0.6. Other suitable perovskites may include, for instance, $Ba_xCa_{1-x}TiO_3$ where x is from about 0.2 to about 0.8, and in some embodiments, from about 0.4 to about 0.6, $Pb_xZr_{1-x}TiO_3$ ("PZT") where x ranges from about 0.05 to about 0.4, lead lanthanum zirconium titanate ("PLZT"), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5KHb_2PO_4$. Still additional complex perovskites may include $A[B1_{1/3}B2_{2/3}]O_3$ materials, where A is $Ba_xSr_{1-x}$ (x can be a value from 0 to 1); B1 is $Mg_yZn_{1-y}$ (y can be a value from 0 to 1); B2 is $Ta_zNb_{1-z}$ (z can be a value from 0 to 1). In one particular embodiment, the dielectric layers may comprise a titanate. However, the dielectric layers may include any suitable dielectric material, such as, for instance, barium titanate, zinc oxide, or any other suitable dielectric material.

The electrode layers may be formed from any of a variety of different electrically conducting materials as is known in the art. The electrode layers may be made from a metal, such as a conductive metal. The materials may include precious metals (e.g., silver, gold, palladium, platinum, etc.), base metals (e.g., copper, tin, nickel, chrome, titanium, tungsten, etc.), and so forth, as well as various combinations thereof. Sputtered titanium/tungsten (Ti/W) alloys, as well as respective sputtered layers of chrome, nickel and gold, may also be suitable. The electrodes may also be made of a low resistive material, such as silver, copper, gold, aluminum, palladium, etc. In one particular embodiment, the electrode layers may comprise nickel or an alloy thereof. However, any other suitable conductor capable of being printed on a dielectric layer may be used to form the electrodes and/or terminals.

The capacitor body may include a plurality of dielectric layers. Some dielectric layers may include electrodes formed thereon, such as the active electrodes and the floating electrodes to form active electrode layers and floating electrode layers, respectively. In general, the thickness of the dielectric layers and the electrode layers is not limited and can be any thickness as desired depending on the performance characteristics of the capacitor. For instance, the thickness of the electrode layers can be, but is not limited to, being about 500 nm or greater, such as about 1 μm or greater, such as about 2 μm or greater, such as about 3 μm or greater, such as about 4 μm or greater to about 10 μm or less, such as about 5 μm or less, such as about 4 μm or less, such as about 3 μm or less, such as about 2 μm or less. For instance, the electrode layers may have a thickness of from about 1 μm to about 2 μm. In addition, in one embodiment, the thickness of the dielectric layer may be defined according to the aforementioned thickness of the electrode layers. Also, it should be understood that such thicknesses of the dielectric layers may also apply to the layers between any active electrode layers, floating electrode layers, and/or dummy electrode layers, when present and as defined herein.

Figure 1:
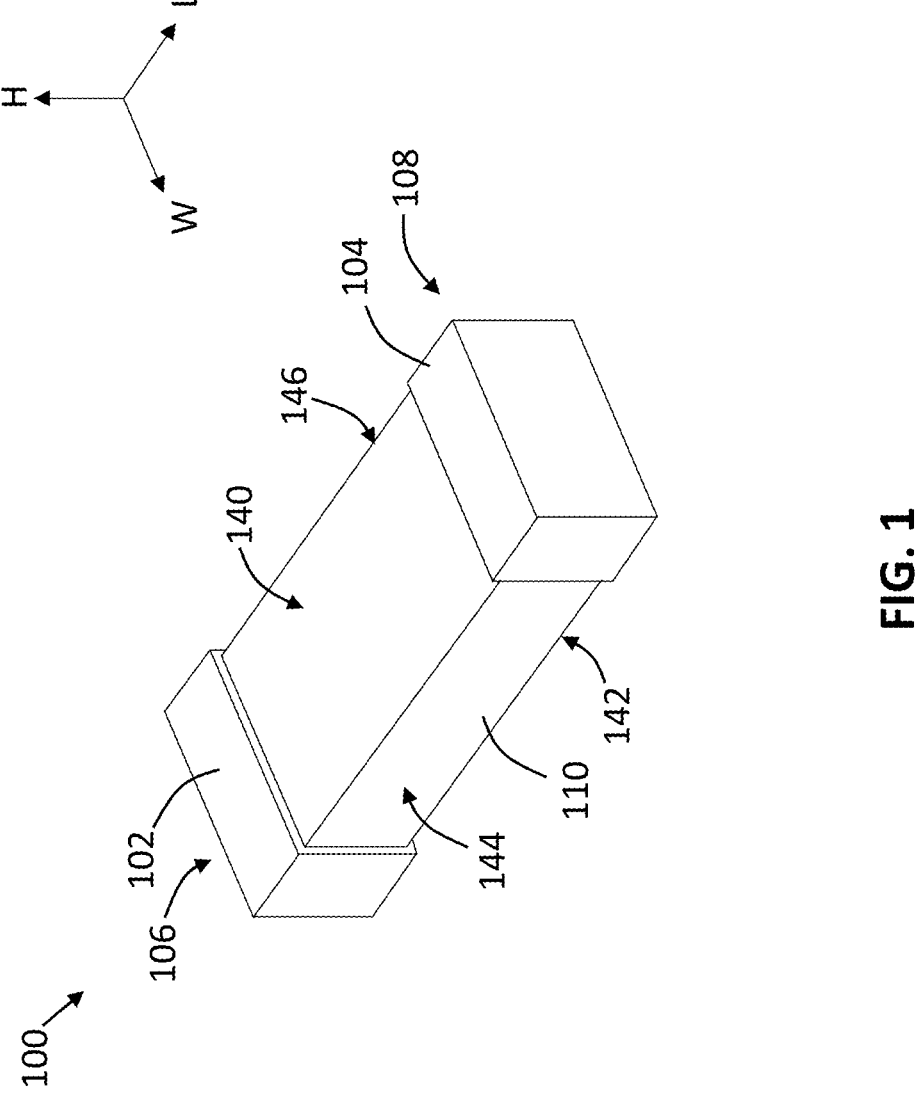
FIG. 1 illustrates a perspective view of a multilayer capacitor in accordance with aspects of this disclosure.

Referring now to the figures, exemplary embodiments of the present disclosure will now be discussed in detail. FIG. 1 illustrates a perspective view of a multilayer capacitor 100 having a first terminal 102 and a second terminal 104. The first terminal 102 and the second terminal 104 are formed on opposite ends 106, 108 of a body 110 of the capacitor 100, where the ends 106, 108 are opposed to one another along a lengthwise direction L. In the depicted embodiment, the first terminal 102 wraps around the first end 106 of the capacitor body 110 and the second terminal 104 wraps around the second end 108 of the capacitor body 110 such that each of the first terminal 102 and second terminal 104 are defined on a respective opposing end surface, both opposing side surfaces 144, 146, a top surface 140, and a bottom surface 142 of the capacitor body 110.

The capacitor 100 may include termination structures, which may include the first terminal 102 and the second terminal 104, for electrically connecting the active electrodes of the capacitor 100 to a circuit (e.g., on a printed circuit board). The first and second terminals 102, 104 may include a metallization layer of platinum, copper, palladium silver, or other suitable conductor material. A chromium/nickel layer, followed by a silver/lead layer, applied by typical processing techniques such as sputtering, can be used as an outer conductive layer for the termination structures.

FIGS. 2A-2C illustrate embodiments of the multilayer capacitor 100 having a cover layer in accordance with aspects of the present disclosure. FIG. 2A is a perspective view of a capacitor 100 without the first and second terminals 102, 104 and with dielectric material 101 shown as transparent to better illustrate a plurality of active electrode layers 112 and a plurality of floating electrode layers 114, which are alternated or interleaved with one another in a cascade configuration, with the dielectric material 101 disposed between individual layers, as described herein. FIG. 2C similarly provides a perspective view of a capacitor 100 without the terminals 102, 104 and with the dielectric material 101 illustrated as transparent.

The dielectric material 101, plurality of active electrode layers 112, and plurality of floating electrode layers form a capacitor body 110. As shown in the schematic cross-sectional view of FIG. 2B, the capacitor 100 also includes the first terminal 102 and the second terminal 104 formed on opposite ends 106, 108 of the capacitor body 110 as described with respect to FIG. 1; as stated, the terminals 102, 104 are omitted from the illustrations of FIGS. 2A and 2C to provide unobstructed views of the layers 112, 114.

As shown in FIGS. 2A-2C, the illustrated capacitor 100 includes a plurality of active electrode layers 112 stacked in a height-wise direction H. Each active electrode layer 112 includes a first active electrode 116 electrically connected with the first terminal 102 and a second active electrode 118 electrically connected with the second terminal 104. Each first active electrode 116 may be spaced apart in a lengthwise direction L from a respective second active electrode 118 within the same active electrode layer 112 to form an active electrode end gap 120. The lengthwise direction L may generally be perpendicular to the height-wise direction H.

The capacitor body 110 defines first and second opposing end surfaces 122, 124. Each first active electrode 116 extends along the first opposing end surface 122 in a widthwise direction W and electrically connects with the first terminal 102 along the first opposing end surface 122. Each second active electrode 118 extends along the second opposing end surface 124 in the widthwise direction W and electrically connects with the second terminal 104 along the second opposing end surface 124. The widthwise direction W may generally be perpendicular to both the lengthwise direction L and the height-wise direction H, i.e., the lengthwise direction L, the widthwise direction W, and the height-wise direction H are generally orthogonal to one another.

As shown in FIGS. 2A-2C, the plurality of floating electrode layers 114 are arranged in an alternating configuration (e.g., interleaved) between respective pairs of active electrode layers 112. Each floating electrode layer 114 includes a floating electrode 126. In some embodiments, the floating electrodes 126 may not be directly electrically connected with any external structure. For example, in FIGS. 2A-2C, the floating electrodes 126 are electrically disconnected from the terminals 102, 104. In some embodiments, the floating electrodes 126 may be generally disposed in the middle of the floating electrode layers 114 with respect to the lengthwise direction L. For example, the floating electrode layers 114 may be disposed approximately an equal distance in the lengthwise direction L from each of the first terminal 102 and second terminal 104.

Referring particularly to FIG. 2B, in some embodiments, the dielectric material 101 of the capacitor 100 may be a plurality of dielectric layers 128 that are disposed, in an alternating fashion, between the active electrode layers 112 and floating electrode layers 114. Although illustrated as disposed between each active electrode layer 112 and adjacent floating electrode layer 114, in some embodiments, the dielectric layers 128 may be disposed between less than all of the active electrode layers 12 and adjacent floating electrode layers 114. Additionally, in some embodiments, each of the dielectric layers 128 may have approximately the same thickness. However, in other embodiments, the dielectric layers 128 may have varying thicknesses such that the distance between floating electrodes 126 and adjacent active electrodes 116, 118 may vary within the capacitor 100.

The floating electrode layers 114 may be spaced apart from the adjacent active electrode layers 112 in the height-wise direction H to form a floating electrode gap 130. As indicated above, in some embodiments, a ratio of the active electrode end gap 120 to the floating electrode gap 130 may be greater than about two (2).

Additionally, in some embodiments, the first active electrode 116 and/or second active electrode 118 may overlap the floating electrode 126 in the lengthwise direction L along an overlap distance 132. The capacitor body has a length 134 in the lengthwise direction L between the first terminal 102 and the second terminal 104. As further shown in FIG. 2B, the first active electrodes 116 may have a first length 136 in the lengthwise direction L, and the second active electrodes 118 may have a second length 138 in the lengthwise direction L.

An overlap ratio may be defined as the length 134 of the capacitor body divided by the overlap distance 132. As indicated above, in some embodiments, the overlap ratio may be less than about five (5). Capacitance may be formed along the overlap distance 132 between the first and second active electrodes 116, 118 and the floating electrode 126. Thus, having an overlap ratio of less than about 5 may allow adequate capacitance without significantly reducing the energy dissipating capabilities of the capacitor 100. In other embodiments, however, the first and second active electrodes 116, 118 may not overlap the floating electrode 126 whatsoever. In yet other embodiments, the overlap ratio can be greater than about five (5).

Referring still to FIGS. 2A-2C, in addition to the first and second opposing end surfaces 122, 124, the capacitor body 110 includes a top surface 140 and a bottom surface 142 opposite the top surface along the height-wise direction H.

The capacitor body 110 also includes a first opposing side surface 144 and a second opposing side surface 146, which oppose each other along the widthwise direction W and which each extend between the top surface 140 and bottom surface 142 along the height-wise direction H and between the first opposing end surface 122 and the second opposing end surface 124 in the lengthwise direction L. As such, in the depicted embodiment, the capacitor body 110 includes six total surfaces (e.g., one top, one bottom, four sides). Thus, in at least some embodiments, the capacitor 100 may have a parallelepiped shape, such as a rectangular parallelepiped shape. In other embodiments, the capacitor 100 may have a different number of surfaces and a different overall shape.

As illustrated in FIGS. 2A-2C, the plurality of floating electrode layers 114 include a topmost floating electrode layer 114T that is the closest of the plurality of floating electrode layers 114 to the top surface 140 and a bottommost floating electrode layer 114B that is closest of the plurality of floating electrode layers 114 to the bottom surface 142. In the depicted embodiment, the plurality of active electrode layers 112 is an odd number such that a topmost active electrode layer 112T is disposed between the topmost floating electrode layer 114T and the top surface 140 and a bottommost active electrode layer 112B is disposed between the bottommost floating electrode layer 114B and the bottom surface 142. For instance, in the embodiment of FIGS. 2A-2C, there are seventeen active electrode layers 112, although it should also be understood that the present disclosure is not limited to any particular odd number of active electrode layers 112. For instance, in some embodiments, the capacitor 100 may include 3 or more active electrode layers 112, 5 or more active electrode layers 112, 11 or more active electrode layers 112, 15 or more active electrode layers 112, 25 or more active electrode layers 112, 35 or more active electrode layers 112, or any suitable odd number of dielectric-electrode layers.

The capacitor 100 of FIGS. 2A-2C includes at least one cover layer 148 that defines at least one of the top surface 140 or bottom surface 142 of the capacitor body 110. That is, a cover layer 148 is disposed between the topmost active electrode layer 112T and the top surface 140, the bottommost active electrode layer 112B and the bottom surface 142, or both. For example, in some embodiments, a first cover layer 148a is disposed over the topmost active electrode layer 112T to define the top surface 140 and a second cover layer 148b is disposed below the bottommost active electrode layer 112B to define the bottom surface 142.

The cover layer(s) 148 may have a cover layer thickness 150 in the height-wise direction H that is at least equal to a thickness of a respective one active electrode layer 112 of the plurality of active electrode layers 112. The cover layer thickness or height 150 in the height-wise direction H may be varied based on the desired performance of a given capacitor. For example, in some embodiments, the cover layer thickness 150 may be approximately equal to the thickness of a single active electrode layer 112, in other embodiments, the cover layer thickness 150 may be approximately equal to the thickness of two active electrode layers 112, in some embodiments the cover layer thickness 150 may be approximately equal to the thickness of three active electrode layers 112, in some embodiments the cover layer thickness 150 may be approximately equal to the thickness of four active electrode layers 112, and in some embodiments the cover layer thickness 150 may be approximately equal to the thickness of five active electrode layers 112. In yet other embodiments, the cover layer thickness 150 may be approximately equal to the thickness of a six or more active electrode layers 112, such as approximately equal to ten or more active electrode layers 112, such as approximately equal to fifteen or more active electrode layers 112, such as approximately equal to twenty or more active electrode layers 112, or such as approximately equal to thirty or more active electrode layers 112.

As shown in FIG. 2A, the first and second active electrodes 116, 118 are generally rectangular in shape, having two end edges 152, 154 and two side edges 156, 158. In FIG. 2A, one end edge 152 of each first active electrode 116 extends to the first opposing end surface 122 to connect with the first terminal 102 (FIGS. 1, 2B), and one end edge 152 of each second active electrode 118 extends to the second opposing end surface 124 to connect with the second terminal 104 (FIGS. 1, 2B). The second end edge 154 of each first active electrode 116 faces the second end edge 154 of the second active electrode 118 of the respective active electrode layer 112, with the second end edges 154 of the first and second active electrodes 116, 118 spaced apart by the active electrode end gap 120. The two side edges 156, 158 of the first and second active electrodes 116, 118 are spaced apart from the first and second opposing side surfaces 144, 146, with dielectric material disposed between the side edges 156, 158 of the active electrodes 116, 118 and the opposing side surfaces 144, 146 of the capacitor body 110.

Referring to FIG. 2C, in some embodiments, the side edges 156, 158 of the first and second active electrodes 116, 118 extend to the first and second opposing side surfaces 144, 146, respectively, to define active electrode "wings." More specifically, rather than being spaced apart from the opposing side surfaces 144, 146, in the embodiment of FIG. 2C, the first active electrode 116 and the second active electrode 118 of each active electrode layer 112 extend to each of the first opposing side surface 144 and the second opposing side surface 146. As such, a portion of the first and second active electrodes 116, 118 extends along each of the first and second opposing side surfaces 144, 146 of the capacitor body 110.

Such extensions of an active electrode 116, 118 to the sides of the capacitor 100, which extend or enlarge a respective electrode 116, 118 in the widthwise direction W, may be referred to as "wings." Extending one or more of the first or second active electrodes 116, 118 to the sides of the capacitor 100 may improve connection with the terminals 102, 104, which may be configured to wrap around the side surfaces as shown in FIG. 1.

Turning now to FIGS. 3A-3C, in some embodiments, the capacitor may include one or more dummy electrode layers. FIGS. 3A and 3C provide perspective views of the capacitor 100 without the terminals 102, 104 and with the dielectric material 101 shown as transparent, similar to FIG. 2A. FIG. 3B provides a schematic cross-sectional view of a capacitor 100 incorporating dummy electrode layers.

In some embodiments of the capacitor 100, at least one dummy electrode layer 160 may be disposed above the topmost active electrode layer 112T and/or at least one dummy electrode layer may be disposed below the bottommost active electrode layer 112B. In the embodiments shown in FIGS. 3A-3C, two dummy electrode layers 160 are disposed above the topmost active electrode layer 112T and two one dummy electrode layers are disposed below the bottommost active electrode layer 112B. However, it will be appreciated that any suitable number of dummy electrode layers 160 may be included in the stack of electrode layers forming the capacitor 100.

Each dummy electrode layer 160 includes a first dummy electrode 162 electrically connected with the first terminal

102 (FIG. 3B) and a second dummy electrode 164 electrically connected with the second terminal 104 (FIG. 3B), with the first dummy electrode 162 spaced apart from the second dummy electrode 164 in the lengthwise direction L by a dummy electrode end gap 166. As shown in FIGS. 3A-3C, the first dummy electrodes 162 may be the same length in the lengthwise direction L as the first active electrodes 116 and the second dummy electrodes 164 may be the same length in the lengthwise direction L as the second active electrodes 118, but in other embodiments, the first dummy electrodes 162 and/or the second dummy electrodes 164 may have a different length than the first active electrodes 116 and/or the second active electrodes 118.

As shown in FIGS. 3A-3C, a dummy electrode layer 160 disposed in the stack of electrode layers 112, 114 and dielectric layers 128 above the topmost active electrode layer 112T may define the top surface 140 of the capacitor body 110. Similarly, a dummy electrode layer disposed in the stack of electrode layers 112, 114 and dielectric layers 128 below the bottommost active electrode layer 112B may define the bottom surface 142 of the capacitor body 110. In other embodiments, however, a cover layer 148 may be disposed over and/or below the dummy electrode layer(s) such that a cover layer 148 defines the top surface 140 and/or the bottom surface 142 of the capacitor body 110.

Referring particularly to FIG. 3C, in some embodiments, the one or more dummy electrodes 162, 164 may define "wings" similar to the wings described above with respect to the active electrodes 116, 118 shown in FIG. 2C. For instance, rather than being spaced apart from the opposing side surfaces 144, 146 as shown in FIG. 3A, in some embodiments, the first dummy electrode 162 and/or the second dummy electrode 164 of at least one dummy electrode layer 160 may extend to each of the first opposing side surface 144 and the second opposing side surface 146 of the capacitor body 110.

More particularly, as shown in FIG. 3C, the dummy electrodes 162, 164 may be generally rectangular in shape with two end edges 168, 170 extending in the widthwise direction W and two side edges 172, 174 extending in the lengthwise direction L. The first end edge 168 of the first dummy electrode 162 extends to the first opposing end surface 122 of the capacitor body 110 to electrically connect to the first terminal 102, and the first end edge 168 of the second dummy electrode 164 extends to the second opposing end surface 124 of the capacitor body 110 to electrically connect to the second terminal 104. In some embodiments, such as illustrated in FIG. 3C, the side edges 172, 174 of each dummy electrode 162, 164 extend to the first opposing side surface 144 and the second opposing side surface 146, respectively, e.g., to improve connection with the first and second terminals 102, 104 in embodiments in which the terminals 102, 104 wrap around to the opposing side surfaces 144, 146. Further, in some embodiments, dummy electrode(s) 162, 164 with wings may be used with one or more active electrodes 116, 118 that also define wings, i.e., with one or more first and/or second active electrodes 116, 118 of the active electrode layers 112 that extend to the first and second opposing side surfaces 144, 146 of the capacitor body 110 such as described with respect to FIG. 2C.

Referring now to FIGS. 4A-4C, rather than first active electrodes 116 and second active electrodes 118 having the same length in the lengthwise direction L as shown in the previous embodiments, in some embodiments, one or more of the first active electrodes 116 may have a length 136 that is different from the length 138 of one or more of the second active electrodes 118. For instance, one of the first active electrode 116 or the second active electrode 118 of a given active electrode layer 112 may be longer than the other of the first active electrode 116 or the second active electrode 118. In the embodiment of FIGS. 4A-4C, the second active electrodes 118 of each active electrode layer 112 are longer than the first active electrodes 116 in the lengthwise direction L. That is, the second length 138 of the second active electrodes 118 is greater than the first length 136 of the first active electrodes 116. Such an unequal electrode length design may be referred to as a "shifted" design, where length is shifted from one active electrode of an active electrode layer to the other active electrode of the layer. Shifted designs allow for two different capacitance values in the cascade capacitor 100.

In some shifted design embodiments, the first length 136 may be longer than the second length 138. For instance, a ratio of the first length 136 to the second length 138 may be within a range of about 1.5 to about 10. In other shifted design embodiments, such as illustrated in FIGS. 4A-4C, the second length 138 may be longer than the first length 136, e.g., a ratio of the second length 138 to the first length 136 may be within a range of about 1.5 to about 10.

Referring particularly to FIG. 4C, a shifted electrode design may also incorporate wings as described herein with respect to the embodiments of FIGS. 2C and 3C. More particularly, an active electrode layer 112 having one of the first active electrode 116 or the second active electrode 118 longer than the other of the first or second active electrode 116, 118 also may have the first active electrode 116 and/or the second active electrode 118 extending to the first and second opposing side surfaces 144, 146 of the capacitor body 110.

As shown in FIG. 4C, where the second active electrodes 118 are longer than the first active electrodes 116, at least a portion of each of the first active electrodes 116 and the second active electrodes 118 extends to the first and second opposing side surfaces 144, 146 of the capacitor body 110. The first active electrodes 116 are generally rectangular in shape similar to the active electrodes described with respect to the embodiments of FIGS. 2C and 3C, and the first end edge 152 of each first active electrode 116 of FIG. 4C extends to the first opposing end surface 122 for electrical connection to the first terminal 102 (FIG. 4B), and the first and second side edges 156, 158 extend to the first and second opposing side surfaces 144, 146, respectively, e.g., to improve connection with the first terminal 102 where the first terminal 102 wraps to the opposing side surfaces 144, 146 such as shown in FIG. 1.

However, the second active electrodes 118, which are longer than the first active electrodes 116, generally have a T shape. That is, in the embodiment of FIG. 4C, only a first portion 156a of the first side edge 156 extends to the first opposing side surface 144, with a second portion 156b of the first side edge 156 offset or spaced apart from the first opposing side surface 144. Similarly, only a first portion 158a of the second side edge 158 extends to the second opposing side surface 146, with a second portion 158b of the second side edge 158 offset or spaced apart from the second opposing side surface 146. The first end edge 152 of the second active electrodes 118 extends to the second opposing end surface 124 of the capacitor body 110 for electrical connection to the second terminal 104 (FIG. 4B), and the first portions 156a, 158a of the first and second side edges 156, 158 of the second active electrodes 118 extend to the first and second opposing side surfaces 144, 146, respectively, e.g., to improve connection with the second terminal 104 where the second terminal 104 wraps to the opposing side surfaces 144, 146 such as shown in FIG. 1. In some embodiments, the entire first and second side edges 156, 158 may extend to the first and second opposing side surfaces 144, 146 of the capacitor body 110. In other embodiments, such as where the second terminal 104 wraps around the second end 108 of the capacitor 100 to extend along only a portion of the first and second opposing side surfaces 144, 146 such as shown in FIG. 1, only a portion of the side edges 156, 158 of the second active electrodes 118 may extend to the first and second opposing side surfaces 144, 146 (e.g., to save the cost and manufacturing time of printing larger second active electrodes that do not provide an added benefit of improved electrical connection).

As described above, the capacitor 100 can include a cover layer 148, which can be dielectric material 101 having a cover layer height or thickness 150 in the height-wise direction and which defines the top surface 140 and/or bottom surface 142 of the capacitor 100. Referring now to FIGS. 5A-5C, in some embodiments, the capacitor 100 may not include a cover layer 148. For example, the topmost active electrode layer 112T may define the top surface 140 and/or the bottommost active electrode layer 112B may define the bottom surface 142, such that a top layer of the capacitor 100 and/or a bottom layer of the capacitor 100 may include exposed active first and second active electrodes 116, 118. As another example of a capacitor 100 without a cover layer 148, a dummy electrode layer 160 may define the top surface 140 and/or bottom surface 142 of the capacitor 100, such as described with respect to FIGS. 3A-3B.

Referring particularly to FIG. 5C, the first active electrode 116 and/or the second active electrode 118 of the topmost active electrode layer 112T and/or the bottommost active electrode layer 112B may define "wings" as described above. For example, as illustrated in FIG. 5C, both the first active electrode 116 and the second active electrode 118 of the topmost active electrode layer 112T, which defines the top surface 140 of the capacitor body 110, and the bottommost active electrode layer 112B, which defines the bottom surface 142 of the capacitor body 110, extend to the first and second opposing side surfaces 144, 146 of the capacitor body 110, rather than being spaced apart from the opposing side surfaces 144, 146 of the capacitor body 110 as shown in FIG. 5A. More particularly, in the embodiment of FIG. 5C, every first active electrode 116 and second active electrode 118 extends to the opposing side surfaces 144, 146, but it will be appreciated that, as described elsewhere herein, one or more of the first active electrodes 116 and/or second active electrodes 118 may extend to the opposing side surfaces 144, 146 to improve electrical connection to the first terminal 102 and/or second terminal 104, where the first active electrodes 116 also are electrically connected to the first terminal 102 along the first opposing end surface 122 and the second active electrodes 118 also are electrically connected to the second terminal 104 along the second opposing end surface 124.

FIGS. 6-13 illustrate insertion loss ($S_{21}$) response curves for the various capacitors 100 described herein and three known capacitor configurations. More particularly, in each of FIGS. 6-13, an insertion loss response curve for one embodiments of a capacitor 100 described above is plotted with an insertion loss response curve 10 for a non-cascade capacitor design having a cover layer and no dummy electrode layers, an insertion loss response curve 20 for a non-cascade capacitor design having a cover layer and a dummy electrode layer, and an insertion loss response curve 30 for a non-cascade capacitor design having a cover layer and no dummy electrode layers. The insertion loss response curves shown in FIGS. 6-13 were generated using computer modeling.

Referring to FIG. 6, an insertion loss response curve 200 is shown for a capacitor 100 according to the embodiment of FIG. 2A. The insertion loss of the capacitor 100 of FIG. 2A was greater than about −0.50 dB for frequencies ranging from about 0 GHz to about 60 GHz. The insertion loss of the capacitor 100 of FIG. 2A was greater than about −0.30 dB for frequencies ranging from about 0 GHz to about 10 GHz, greater than about −0.40 dB for frequencies ranging from about 10 GHz to about 20 GHz, greater than about −0.25 dB for frequencies ranging from about 20 GHz to about 30 GHz, greater than about −0.35 dB for frequencies ranging from about 30 GHz to about 40 GHz, greater than about −0.45 dB for frequencies ranging from about 40 GHz to about 50 GHz, and greater than about −0.50 dB for frequencies ranging from about 50 GHz to about 60 GHz.

Referring to FIG. 7, an insertion loss response curve 250 is shown for a capacitor 100 according to the embodiment of FIG. 2C. The insertion loss of the capacitor 100 of FIG. 2C was greater than about −0.60 dB for frequencies ranging from about 0 GHz to about 60 GHz. The insertion loss of the capacitor 100 of FIG. 2C was greater than about −0.15 dB for frequencies ranging from about 0 GHz to about 10 GHz, greater than about −0.20 dB for frequencies ranging from about 10 GHz to about 20 GHz, greater than about −0.25 dB for frequencies ranging from about 20 GHz to about 30 GHz, greater than about −0.25 dB for frequencies ranging from about 30 GHz to about 40 GHz, greater than about −0.40 dB for frequencies ranging from about 40 GHz to about 50 GHz, and greater than about −0.60 dB for frequencies ranging from about 50 GHz to about 60 GHz.

Referring to FIG. 8, an insertion loss response curve 300 is shown for a capacitor 100 according to the embodiment of FIG. 3A. The insertion loss of the capacitor 100 of FIG. 3A was greater than about −0.45 dB for frequencies ranging from about 0 GHz to about 60 GHz. The insertion loss of the capacitor 100 of FIG. 3A was greater than about −0.35 dB for frequencies ranging from about 0 GHz to about 10 GHz, greater than about −0.30 dB for frequencies ranging from about 10 GHz to about 20 GHz, greater than about −0.30 dB for frequencies ranging from about 20 GHz to about 30 GHz, greater than about −0.30 dB for frequencies ranging from about 30 GHz to about 40 GHz, greater than about −0.40 dB for frequencies ranging from about 40 GHz to about 50 GHz, and greater than about −0.45 dB for frequencies ranging from about 50 GHz to about 60 GHz.

Referring to FIG. 9, an insertion loss response curve 350 is shown for a capacitor 100 according to the embodiment of FIG. 3C. The insertion loss of the capacitor 100 of FIG. 3C was greater than about −0.55 dB for frequencies ranging from about 0 GHz to about 60 GHz. The insertion loss of the capacitor 100 of FIG. 3C was greater than about −0.15 dB for frequencies ranging from about 0 GHz to about 10 GHz, greater than about −0.20 dB for frequencies ranging from about 10 GHz to about 20 GHz, greater than about −0.20 dB for frequencies ranging from about 20 GHz to about 30 GHz, greater than about −0.25 dB for frequencies ranging from about 30 GHz to about 40 GHz, greater than about −0.35 dB for frequencies ranging from about 40 GHz to about 50 GHz, and greater than about −0.55 dB for frequencies ranging from about 50 GHz to about 60 GHz.

Referring to FIG. 10, an insertion loss response curve 400 is shown for a capacitor 100 according to the embodiment of FIG. 4A. The insertion loss of the capacitor 100 of FIG. 4A was greater than about −0.40 dB for frequencies ranging from about 0 GHz to about 60 GHz. The insertion loss of the capacitor 100 of FIG. 4A was greater than about −0.25 dB for frequencies ranging from about 0 GHz to about 10 GHz, greater than about −0.30 dB for frequencies ranging from about 10 GHz to about 20 GHz, greater than about −0.20 dB for frequencies ranging from about 20 GHz to about 30 GHz, greater than about −0.35 dB for frequencies ranging from about 30 GHz to about 40 GHz, greater than about −0.35 dB for frequencies ranging from about 40 GHz to about 50 GHz, and greater than about −0.40 dB for frequencies ranging from about 50 GHz to about 60 GHz.

Referring to FIG. 11, an insertion loss response curve 450 is shown for a capacitor 100 according to the embodiment of FIG. 4C. The insertion loss of the capacitor 100 of FIG. 4C was greater than about −0.45 dB for frequencies ranging from about 0 GHz to about 60 GHz. The insertion loss of the capacitor 100 of FIG. 4C was greater than about −0.15 dB for frequencies ranging from about 0 GHz to about 10 GHz, greater than about −0.20 dB for frequencies ranging from about 10 GHz to about 20 GHz, greater than about −0.20 dB for frequencies ranging from about 20 GHz to about 30 GHz, greater than about −0.25 dB for frequencies ranging from about 30 GHz to about 40 GHz, greater than about −0.35 dB for frequencies ranging from about 40 GHz to about 50 GHz, and greater than about −0.45 dB for frequencies ranging from about 50 GHz to about 60 GHz.

Referring to FIG. 12, an insertion loss response curve 500 is shown for a capacitor 100 according to the embodiment of FIG. 5A. The insertion loss of the capacitor 100 of FIG. 5A was greater than about −0.50 dB for frequencies ranging from about 0 GHz to about 60 GHz. The insertion loss of the capacitor 100 of FIG. 5A was greater than about −0.15 dB for frequencies ranging from about 0 GHz to about 10 GHz, greater than about −0.20 dB for frequencies ranging from about 10 GHz to about 20 GHz, greater than about −0.25 dB for frequencies ranging from about 20 GHz to about 30 GHz, greater than about −0.25 dB for frequencies ranging from about 30 GHz to about 40 GHz, greater than about −0.40 dB for frequencies ranging from about 40 GHz to about 50 GHz, and greater than about −0.50 dB for frequencies ranging from about 50 GHz to about 60 GHz.

Referring to FIG. 13, an insertion loss response curve 550 is shown for a capacitor 100 according to the embodiment of FIG. 5C. The insertion loss of the capacitor 100 of FIG. 5C was greater than about −0.55 dB for frequencies ranging from about 0 GHz to about 60 GHz. The insertion loss of the capacitor 100 of FIG. 5C was greater than about −0.10 dB for frequencies ranging from about 0 GHz to about 10 GHz, greater than about −0.15 dB for frequencies ranging from about 10 GHz to about 20 GHz, greater than about −0.20 dB for frequencies ranging from about 20 GHz to about 30 GHz, greater than about −0.20 dB for frequencies ranging from about 30 GHz to about 40 GHz, greater than about −0.30 dB for frequencies ranging from about 40 GHz to about 50 GHz, and greater than about −0.55 dB for frequencies ranging from about 50 GHz to about 60 GHz.

FIG. 14 illustrates insertion loss ($S_{21}$) response curves, generated using computer modeling, for a capacitor 100 as shown in FIG. 2A with a cover layer 148 of varying cover layer heights or thicknesses 150 and a capacitor as shown in FIG. 5A with no cover layer 148. More particularly, FIG. 14 illustrates (1) an insertion loss curve 1100 for a capacitor 100 configured as shown in FIG. 2A including a cover layer 148 having a first cover layer thickness 150, (2) an insertion loss curve 1200 for a capacitor 100 configured as shown in FIG. 2A including a cover layer 148 having a second cover layer thickness 150, (3) an insertion loss curve 1300 for a capacitor 100 configured as shown in FIG. 2A including a cover layer 148 having a third cover layer thickness 150, and (4) an insertion loss curve 1400 for a capacitor 100 configured as shown in FIG. 5A having no cover layer 148. The first cover layer thickness 150 may be less than the second cover layer thickness 150, and the second cover layer thickness 150 may be less than the third cover layer thickness 150. That is, the third cover layer thickness 150 may be the largest or greatest cover layer thickness 150 and the first cover layer thickness 150 may be the smallest cover layer thickness 150 of the three modeled capacitors 100, with the second cover layer thickness 150 having a value between the first cover layer thickness 150 and the third cover layer thickness 150. For the modeled capacitors 100, the second cover layer thickness 150 was two times (2×) the first cover layer thickness and the third cover layer thickness 150 was three times (3×) the first cover layer thickness, with the first cover layer thickness 150 being approximately 0.144 mil (for a fired component).

As shown in FIG. 14, for the modeled capacitors, the capacitor 100 having no cover layer 148 generally had a greater insertion loss than the capacitors 100 having a cover layer 148. At frequencies within a range of about 24 GHz to about 32 GHz, the insertion loss was similar for the four modeled capacitors, with the insertion loss ranging from about −0.20 dB at about 24 GHz to about −0.24 dB at about 32 GHz.

As illustrated in FIG. 14, the insertion loss curve 1100 ranges from about −0.02 dB at about 0 GHz to about −0.42 dB at about 60 GHz. The insertion loss curve 1100 has insertion loss values greater than about −0.26 dB for frequencies ranging from about 0 GHz to about 10 GHz, greater than about −0.28 dB for frequencies ranging from about 10 GHz to about 20 GHz, greater than about −0.24 dB for frequencies ranging from about 20 GHz to about 30 GHz, greater than about −0.30 dB for frequencies ranging from about 30 GHz to about 40 GHz, greater than about −0.40 dB for frequencies ranging from about 40 GHz to about 50 GHz, and greater than about −0.42 dB for frequencies ranging from about 50 GHz to about 60 GHz.

As further illustrated in FIG. 14, the insertion loss curve 1200 ranges from about −0.02 dB at about 0 GHz to about −0.46 dB at about 60 GHz. The insertion loss curve 1200 has insertion loss values greater than about −0.26 dB for frequencies ranging from about 0 GHz to about 10 GHz, greater than about −0.36 dB for frequencies ranging from about 10 GHz to about 20 GHz, greater than about −0.22 dB for frequencies ranging from about 20 GHz to about 30 GHz, greater than about −0.32 dB for frequencies ranging from about 30 GHz to about 40 GHz, greater than about −0.42 dB for frequencies ranging from about 40 GHz to about 50 GHz, and greater than about −0.46 dB for frequencies ranging from about 50 GHz to about 60 GHz.

As also depicted in FIG. 14, the insertion loss curve 1300 ranges from about −0.02 dB at about 0 GHz to about −0.46 dB at about 60 GHz. The insertion loss curve 1300 has insertion loss values greater than about −0.26 dB for frequencies ranging from about 0 GHz to about 10 GHz, greater than about −0.52 dB for frequencies ranging from about 10 GHz to about 20 GHz, greater than about −0.24 dB for frequencies ranging from about 20 GHz to about 30 GHz, greater than about −0.36 dB for frequencies ranging from about 30 GHz to about 40 GHz, greater than about −0.44 dB for frequencies ranging from about 40 GHz to about 50 GHz, and greater than about −0.46 dB for frequencies ranging from about 50 GHz to about 60 GHz.

Moreover, as shown in FIG. 14, the insertion loss curve 1400 ranges from about −0.02 dB at about 0 GHz to about −0.42 dB at about 60 GHz. The insertion loss curve 1400 has insertion loss values greater than about −0.16 dB for frequencies ranging from about 0 GHz to about 10 GHz, greater than about −0.18 dB for frequencies ranging from about 10 GHz to about 20 GHz, greater than about −0.22 dB for frequencies ranging from about 20 GHz to about 30 GHz, greater than about −0.26 dB for frequencies ranging from about 30 GHz to about 40 GHz, greater than about −0.40 dB for frequencies ranging from about 40 GHz to about 50 GHz, and greater than about −0.52 dB for frequencies ranging from about 50 GHz to about 60 GHz.

The capacitors disclosed herein may find applications in a wide variety of devices. For example, the capacitors described herein may be used in radio frequency antenna/amplifier circuits. The capacitors may also find application in various technologies including laser drivers, sensors, radars, radio frequency identification chips, near field communication, data lines, Bluetooth, optics, Ethernet, and in any suitable circuit.

These and other modifications and variations of the present invention may be practiced by those of ordinary skill in the art, without departing from the spirit and scope of the present invention. In addition, it should be understood that aspects of the various embodiments may be interchanged both in whole or in part. Further, those of ordinary skill in the art will appreciate that the foregoing description is by way of example only and is not intended to limit the invention so further described in such appended claims. For instance, this written description uses examples to disclose the present disclosure, including the best mode, and also to enable any person skilled in the art to practice the disclosure, including making and using any devices or systems and performing any incorporated methods. The patentable scope of the disclosure is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A multilayer capacitor having a rectangular configuration defining first and second opposing end surfaces offset in a lengthwise direction, first and second opposing side surfaces offset in a widthwise direction, and top and bottom surfaces offset in a height-wise direction, the multilayer capacitor comprising:

a first terminal adjacent the first opposing end surface;

a second terminal adjacent the second opposing end surface;

a plurality of active electrode layers, each active electrode layer of the plurality of active electrode layers comprising a first active electrode electrically connected with the first terminal and extending to each of the first opposing side surface and the second opposing side surface and a second active electrode electrically connected with the second terminal and extending to each of the first opposing side surface and the second opposing side surface, the first active electrode spaced apart from the second active electrode in the lengthwise direction to form an active electrode end gap; and a plurality of floating electrode layers, each floating electrode layer of the plurality of floating electrode layers comprising a floating electrode, the plurality of floating electrode layers including a topmost floating electrode layer closest of the plurality of floating electrode layers to the top surface and a bottommost floating electrode layer closest of the plurality of floating electrode layers to the bottom surface, wherein one of the first active electrode or the second active electrode of a respective one active electrode layer is longer than the other of the first active electrode or the second active electrode in the lengthwise direction, wherein the first active electrode and the second active electrode of each active electrode layer is rectangular in shape, and wherein the plurality of active electrode layers is an odd number such that a topmost active electrode layer is disposed between the topmost floating electrode layer and the top surface and a bottommost active electrode layer is disposed between the bottommost floating electrode layer and the bottom surface.

2. The multilayer capacitor of claim 1, wherein a first cover layer is disposed over the topmost active electrode layer to define the top surface and a second cover layer is disposed below the bottommost active electrode layer to define the bottom surface.

3. The multilayer capacitor of claim 2, wherein the first cover layer and the second cover layer each have a cover layer thickness that is at least equal to a thickness of a respective one active electrode layer of the plurality of active electrode layers.

4. The multilayer capacitor of claim 1, further comprising:
at least one dummy electrode layer disposed above the topmost active electrode layer, the at least one dummy electrode layer comprising a first dummy electrode electrically connected with the first terminal and a second dummy electrode electrically connected with the second terminal.

5. The multilayer capacitor of claim 4, wherein the at least one dummy electrode layer defines the top surface.

6. The multilayer capacitor of claim 4, wherein the first dummy electrode and the second dummy electrode of the at least one dummy electrode layer extend to each of the first opposing side surface and the second opposing side surface.

7. The multilayer capacitor of claim 1, further comprising:
at least one dummy electrode layer disposed below the bottommost active electrode layer, the at least one dummy electrode layer comprising a first dummy electrode electrically connected with the first terminal and a second dummy electrode electrically connected with the second terminal.

8. The multilayer capacitor of claim 7, wherein the at least one dummy electrode layer defines the bottom surface.

9. The multilayer capacitor of claim 7, wherein the first dummy electrode and the second dummy electrode of the at least one dummy electrode layer extend to each of the first opposing side surface and the second opposing side surface.

10. The multilayer capacitor of claim 7, wherein the at least one dummy electrode layer is at least one bottom dummy electrode layer, and further comprising:
at least one top dummy electrode layer disposed above the topmost active electrode layer, the at least one top dummy electrode layer comprising a first dummy electrode electrically connected with the first terminal and a second dummy electrode electrically connected with the second terminal.

11. The multilayer capacitor of claim 1, wherein the first active electrode has a first length in the lengthwise direction and the second active electrode has a second length in the lengthwise direction, and wherein a ratio of the first length to the second length is within a range of about 1.5 to about 10.

12. The multilayer capacitor of claim 1, wherein the topmost active electrode layer defines the top surface and the bottommost active electrode layer defines the bottom surface.

13. A multilayer capacitor, comprising:
a capacitor body having a first opposing end surface opposite a second opposing end surface along a lengthwise direction and a first opposing side surface and a second opposing side surface along a widthwise direction;
a first terminal adjacent the first opposing end surface;
a second terminal adjacent the second opposing end surface;
a plurality of active electrode layers, each active electrode layer of the plurality of active electrode layers comprising a first active electrode electrically connected with the first terminal and a second active electrode electrically connected with the second terminal, the first active electrode spaced apart from the second active electrode in the lengthwise direction to form an active electrode end gap; and
a plurality of floating electrode layers, each floating electrode layer of the plurality of floating electrode layers comprising a floating electrode,
wherein one of the first active electrode or the second active electrode of a respective one active electrode layer is longer than the other of the first active electrode or the second active electrode in the lengthwise direction,
wherein a width in the widthwise direction of each of the first active electrode and the second active electrode of the respective one active electrode layer is the same,
wherein a number of active electrode layers is one greater than a number of floating electrode layers,
wherein the plurality of active electrode layers is interleaved with the plurality of floating electrode layers in a stack along a height-wise direction, the stack having a top layer and a bottom layer, and
wherein a respective one active electrode layer of the plurality of active electrode layers forms the top layer in the stack and a respective one active electrode layer of the plurality of active electrode layers forms the bottom layer in the stack.

14. The multilayer capacitor of claim 13, wherein an insertion loss of the multilayer capacitor is greater than about −0.60 dB over a frequency range of about 0 GHz to about 60 GHz.

15. The multilayer capacitor of claim 13, wherein an insertion loss of the multilayer capacitor is greater than about −0.35 dB over a frequency range of about 10 GHz to about 40 GHz.

16. The multilayer capacitor of claim 13, wherein the multilayer capacitor has a transient energy capability, as determined by a 10×1000 microsecond pulse, which is greater than about 0.01 Joules.

17. The multilayer capacitor of claim 13, wherein a respective one floating electrode layer of the plurality of floating electrode layers is spaced apart from an adjacent active electrode layer of the plurality of active electrode layers in the height-wise direction to form a floating electrode gap, wherein a ratio of the active electrode end gap to the floating electrode gap is greater than about 2, wherein the first active electrode of a respective one active electrode layer overlaps the floating electrode of an adjacent floating electrode layer in the lengthwise direction along an overlap distance, wherein the capacitor body has a length in the lengthwise direction between the first terminal and the second terminal, wherein an overlap ratio is a ratio of the length of the capacitor body to the overlap distance, and wherein the overlap ratio is less than about 5.

18. The multilayer capacitor of claim 13, wherein the first active electrode and the second active electrode of each active electrode layer extends to each of the first opposing side surface and the second opposing side surface, and wherein the first active electrode and the second active electrode of each active electrode layer is rectangular in shape.

19. The multilayer capacitor of claim 13, wherein the first active electrode has a first length in the lengthwise direction and the second active electrode has a second length in the lengthwise direction, and wherein a ratio of the first length to the second length is within a range of about 1.5 to about 10.

\* \* \* \* \*